United States Patent [19]
Dehmlow et al.

[11] Patent Number: 5,999,187
[45] Date of Patent: Dec. 7, 1999

[54] FLY-THROUGH COMPUTER AIDED DESIGN METHOD AND APPARATUS

[75] Inventors: James Dehmlow; John Gass, both of Bellevue; Lynne M. Evans, Kent; Craig Daw, Renton, all of Wash.

[73] Assignee: Resolution Technologies, Inc., Bellevue, Wash.

[21] Appl. No.: 08/883,781

[22] Filed: Jun. 27, 1997

Related U.S. Application Data

[60] Provisional application No. 60/020,524, Jun. 28, 1996.

[51] Int. Cl.⁶ .................................................. G06F 15/00
[52] U.S. Cl. ....................... 345/420; 345/428; 345/424; 382/199
[58] Field of Search ..................................... 345/420, 424; 355/419–424, 427–428; 382/199, 203

[56] References Cited

U.S. PATENT DOCUMENTS

| | | | |
|---|---|---|---|
| 4,694,404 | 9/1987 | Meagher | 364/518 |
| 4,710,876 | 12/1987 | Cline et al. | 364/414 |
| 4,719,585 | 1/1988 | Cline et al. | 364/518 |
| 4,729,098 | 3/1988 | Cline et al. | 364/414 |
| 4,865,423 | 9/1989 | Doi | 350/320 |
| 4,882,679 | 11/1989 | Tuy et al. | 364/413 |
| 4,961,154 | 10/1990 | Pomerantz et al. | 364/522 |
| 5,095,521 | 3/1992 | Trousset et al. | 395/121 |
| 5,123,084 | 6/1992 | Prevost et al. | 395/120 |
| 5,170,347 | 12/1992 | Tuy et al. | 364/413.22 |
| 5,218,671 | 6/1993 | Liao et al. | 395/131 |
| 5,345,490 | 9/1994 | Finnigan et al. | 378/4 |
| 5,381,518 | 1/1995 | Drebin et al. | 395/124 |
| 5,412,763 | 5/1995 | Knoplioch et al. | 395/124 |
| 5,414,801 | 5/1995 | Smith et al. | 395/119 |
| 5,475,422 | 12/1995 | Mori et al. | 348/48 |
| 5,517,602 | 5/1996 | Natarajan | 395/119 |
| 5,579,455 | 11/1996 | Greene et al. | 395/122 |
| 5,596,690 | 1/1997 | Stone et al | 345/433 |
| 5,613,049 | 3/1997 | Brechner et al. | 395/120 |
| 5,615,321 | 3/1997 | Corn | 395/133 |
| 5,638,190 | 6/1997 | Geist | 358/500 |
| 5,729,254 | 3/1998 | Marks et al. | 345/420 |
| 5,825,998 | 10/1998 | Brechner | 345/428 |

OTHER PUBLICATIONS

Chamberlain, B., T. DeRose, D. Lischinski, D. Salesin and J. Snyder, "Fast Rendering of Complex Environments Using a Spatial Hierarchy", Graphics Interface, May 1996.

Funkhouser, T.A. and C.H. Sequin, Aug. 1993, "Adaptive Display Algorithm for Interactive Frame Rates During Visualization of Complex Virtual Environments", In Computer Graphics Proceedings, Annaul Conference Series, ACM SIGGRAPH, 247–254.

(List continued on next page.)

*Primary Examiner*—Mark Zimmerman
*Assistant Examiner*—Chante' Harrison
*Attorney, Agent, or Firm*—Sheridan Ross P.C.

[57] ABSTRACT

A fly-through, three-dimensional computer aided design system is provided. Computational requirements are bounded, at least in part by defining a bounded volume or world defining the volume which may be displayed, in whole or in part. Preprocessing the data assists in organizing the data for high performance display. Full detail rendering is available. However in some situations, such as during fly-through, some or all portions of the image are rendered in a simplified fashion, e.g. to maintain a high frame rate. The volume-based simplification involves rendering faces of cells or collections of cells which are at least partly intersected by components of the item or system being displayed. A plurality of granularities, preferably organized as an octree, provide multiple levels of detail. Unnecessary rendering load is reduced by view frustum culling and considering certain cell face occlusion situations. As the scene is rendered, preferably slicewise, the level of detail for slices can be adjusted based on predictions of time-to-complete, in order to meet a frame rate target.

63 Claims, 11 Drawing Sheets

OTHER PUBLICATIONS

Greene, N., M. Kass and G.iller, Aug. 1993, "Hierarchical 2–Buffer Visitality", In Computer Graphics Proceedings, Annual Conference Series, ACM SIGGRAPHIC, 231–238.

Lanr, D. And P. Hanrahan, Jul. 1991, "Hierarchical Splatting: A Progressive Refinement Algorrithm for Volume Rendering", Computer Graphics (SIGGRAPHIC '91 Proceedings) 25(4), 285–288.

Rohif, J. And J. Heiman, Jul. 1994, Iris Performer: A High Performance Multiprocessing Toolkit for Real–Time 3D Graphics, In Computer Graphics Proceedings, Annual Conference Series, ACM SIGGRAPH, 381–394.

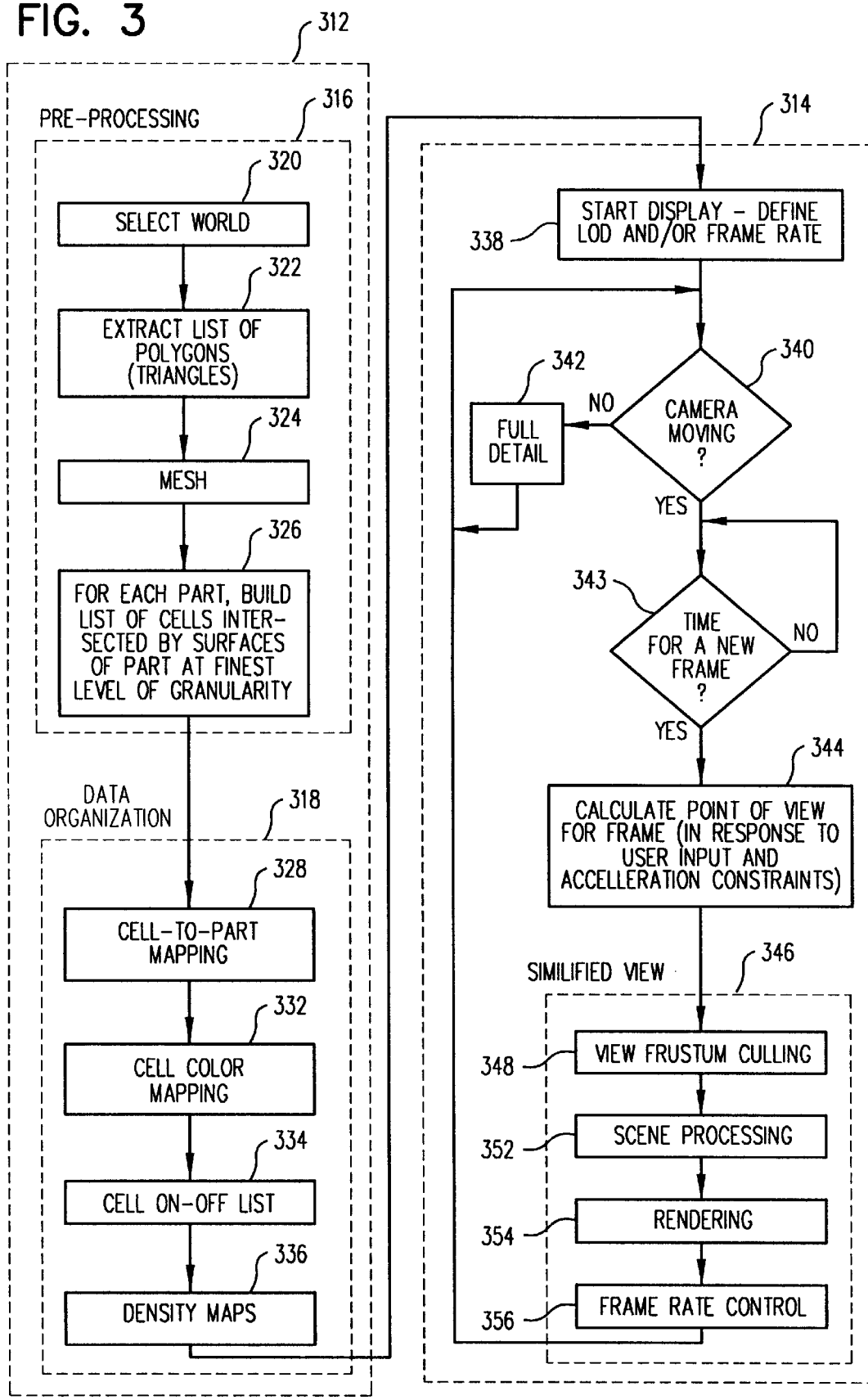

FIG. 6A

| HEADER | PART NAME | NO. OF TRIANGLES | PART BOUNDING BOX | NO. OF MESHES | COLOR INDEX | NO. OF PART VERTICES | VERTEX COORDINATES | VERTEX END MARKER | NUMBER OF INDEX PAIRS | MESH END MARKER | ... |
|---|---|---|---|---|---|---|---|---|---|---|---|
| | 612 | 614 | 616 | 618 | 620 | | | | | | |

622 spans NO. OF PART VERTICES and VERTEX COORDINATES
624 spans VERTEX END MARKER, NUMBER OF INDEX PAIRS, MESH END MARKER

| NORMAL COORDINATES | NORMAL END MARKER | PART END MARKER |
|---|---|---|
| 626 | | 628 |

FIG. 6B

| HEADER | FORMAT VERSION NO. | WORLD SIGNATURE | CELL LEVEL | PART NAME | NO. OF RLE'S | RLE DATA | RLE END MARKER | PART END MARKER |
|---|---|---|---|---|---|---|---|---|
| | 632 | 634 | 636 | 638 | | | | |

642 spans NO. OF RLE'S and RLE DATA
644 spans RLE DATA, RLE END MARKER, PART END MARKER

FLY-THROUGH COMPUTER AIDED DESIGN METHOD AND APPARATUS

This application claims priority based on U.S. provisional application Ser. No. 06/020,524 filed Jun. 28, 1996 which is incorporated herein by reference.

The present invention is directed to a computer-aided design system, including a system implemented by computer software, and in particular to a fly-through, three-dimensional design system with multiple levels of details.

BACKGROUND INFORMATION

A computer-aided design system typically includes software for displaying on a two-dimensional computer display screen or other display device, an image of one or more predefined objects. In a typical application, the objects are parts or components of a product such as a machine or other device such as a vehicle, aircraft, ship, and the like. In a typical situation, a designer will provide input which defines the size and shape of the various components. The computer-aided design system provides a display indicating how the various components will mesh or fit together in three dimensions (or, in some cases, will indicate that the components do not properly fit together, thus alerting the designer that there is an error which needs to be corrected). In many computer-aided design systems, a user may select the point of view of the object or collection of objects, for example, the user may wish to see a front view, a side view, a top view, a perspective view, etc. In some systems, the definition of point of view is essentially static, i.e., the user inputs (e.g., via a keyboard or otherwise) a single point of view, and the software displays an image in accordance with the defined point of view.

In some systems, however, it is desired to simulate a real-time change in the point of view. For purposes of discussion, it is useful to consider the point of view in terms of a "virtual camera," i.e., what the collection of objects would look like if the display simulates the output of a camera as it moved with respect to the simulated objects. In theory, the virtual camera can rotate in any of three rotational directions, and can translate parallel any of three mutually perpendicular translational axes or any combination thereof. In a system in which all six types of motions are possible, the camera is said to possess six degrees of freedom. In such a system the virtual camera can translate or rotate in any direction with respect to the simulated collection of objects.

A particularly desirable design system provides a "fly-through" ability. In a fly-through system, a user may indicate a desired direction of movement and/or rotation of the virtual camera (e.g., using a mouse, joystick, trackball, head tracker, eye tracker, voice actuated command, and the like). In response, the computer display screen, under control of the design system software, will depict a series of images indicating the various views that would be taken by the virtual camera as it moves in the indicated direction.

A fly-through system is particularly useful in the design of complex structures such as aircraft or automobiles which may have thousands or millions of components. A fly-through system provides the user with the ability to inspect any desired portion of the device by quickly and easily moving to the region-of-interest and/or moving the virtual camera around the region-of-interest to inspect it from different points of view. In order to achieve a fly-through system which is useful for location and inspection purposes, and which can be used for relatively long periods of time without unduly tiring the viewer, the series of images presented on the screen during a fly-through operation must have a frame frequency sufficiently high that an illusion of motion, similar to a motion picture, is provided. A frame rate which is too low can make it difficult to locate desired volumes and can cause eye strain or other undesirable visual effect.

Although, for reasons noted above, a high frame-frequency fly-through design system is desirable, it has been difficult to implement, particularly at a reasonable cost, since rendering of images, particularly images which depict a three-dimensional object or scene, is one of the most computationally-intensive and resource-intensive (especially memory-intensive) tasks that can be performed on a computer. In particular, it has been difficult to implement a useful fly-through three-dimensional design system on a workstation-level system, at reasonable expense.

Accordingly, it would be useful to provide a design system which provides for fly-through capability at a high-frame rate, capable of use for designs having millions of components but which can be implemented on a system at reasonable cost, preferably with little or no special hardware requirements beyond those found on a workstation-level computer.

SUMMARY OF THE INVENTION

According to the present invention, certain techniques are employed to simplify the image during a fly-through procedure so that a high frame rate can be retained during fly-through. A number of simplification techniques are described which avoid interfering with the navigational and/or inspection functions of a fly-through procedure.

A volume-based simplification technique is described. The simplification involves rendering faces of volumetric regions or cells (such as cubes) or collections of cells. A cell is rendered if a surface (not volume) of at least one part intersects the cell. Preferably data is stored indicating which cells are marked "on" (i.e., are intersected by at least one part). A plurality of cell granularities preferably organized as an octree, provide multiple levels of detail.

Preferably, parts are grouped based on their spatial proximity. The user can define a boundary so that the processing occurs in a spatially limited volume or "world." Because each defined "world" is finite, the computational procedures are bounded, which assists in providing the desired performance level such as a high frame rate (e.g., about 10 hertz or more).

The data defining the parts is pre-processed (i.e., processed prior to loading into the viewer for display) in a fashion which organizes the data to achieve very rapid image processing. The simplified image can be presented in multiple levels of details, and preferably the user may control the tradeoff between image quality (i.e., the level of detail), and the interactive nature (e.g., the frame rate of the system). Several techniques provide the effect of using a finer level of detail for those parts that are closer to the virtual camera, and coarser levels of detail for parts that are further away.

The computational load is also kept within bounds by a particularly fast view frustum culling procedure. Additionally, the system can, relatively rapidly, determine which faces of various image components of cells will ultimately need to be drawn, and which are occluded.

In one embodiment, images are rendered by slices in front-to-back order (i.e., away from the point of view or virtual camera). For each slice, a prediction of rendering time is used to determine if the target level of detail can be used without impinging on the overall frame rate. If not, a coarser level of detail is automatically is substituted. The prediction of rendering time can be adjusted based on the history of actual rendering times of various slices.

Although various options or techniques for achieving a high frame rate and/or simplifying an image can be used, the techniques disclosed herein have been found to be particularly effective for implementation at a reasonable cost and with reasonable hardware and/or memory requirements. Although a number of the techniques disclosed herein provide useful advantages in themselves, several techniques also interact with one another in an advantageous manner to produce results which exceed those that would be expected from the sum of the advantages of the individual techniques.

BRIEF DESCRIPTION OF THE DRAWINGS

FIG. 3 is a flowchart depicting a process according to an embodiment of the present invention;

FIGS. 6A and 6B depict file structures for storing or transmitting data according to embodiments of the present invention;

DETAILED DESCRIPTION OF THE PREFERRED EMBODIMENTS

Before describing the details of the present invention, it is believed useful to provide a discussion of certain basic concepts in connection with image rendering.

Among the various approaches that can be taken when considering a design system are world approaches versus parametric approaches. In a parametric system, locations in space are defined or described in terms of variables or parameters which are, theoretically, of unlimited range. For example, geometric objects can be defined in a Cartesian coordinate system using well-known analytic geometry techniques. This system of description is theoretically unbounded and values or parameters can take on any size or magnitude. In such a system it is impossible to know in advance size of a given computational problem since the system is unbounded.

In contrast, the present invention uses a world system in which a bounded coordinate system defines where the object or objects exist in space. In the world system, a coordinate system is used to define where the product sits in space and a boundary is established in this coordinate system relative to the product. The boundary can be defined in various fashions, e.g. to encompass the entire product or collection of objects, a portion of the product that is of interest, the product and its surroundings (e.g., associated tooling or use environment), and the like. In any case, however, the system is bounded. The bounded world system of the present invention is useful in a number of fashion, as will be apparent from the discussion below. The world system of the present invention provides the opportunity for pre-processing data for spatial organization and rendering performance. The user may define different worlds to suit his or her purpose, such as a product-only world and a product-environment world. A default viewing position (or "home" position) can be defined for each world, which is particularly useful in complex images having millions of parts in which a user can easily become "lost." Different color, surface or texture mapping can be defined for each world, e.g., to give meaning to, or indicate function of the parts displayed in the world.

Figure 1A:
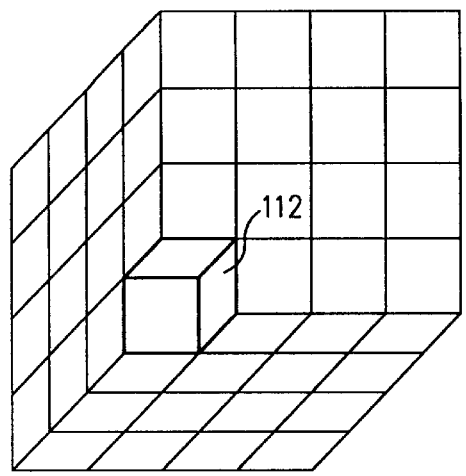
FIGS. 1A through 1C depict a coordinate system having increasing granularity.
Figure 1B:
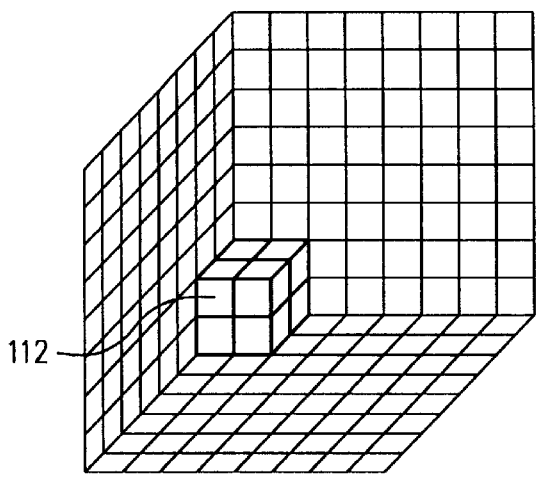
Figure 1C:
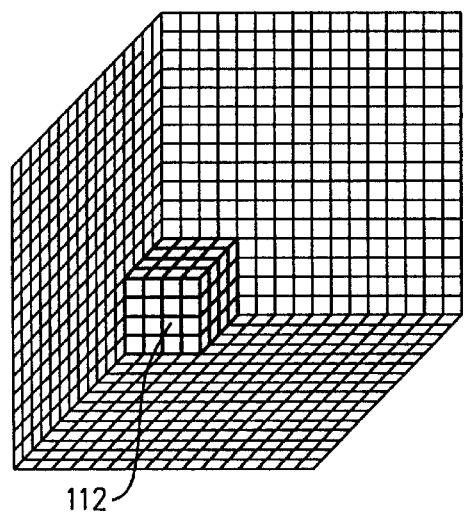

Boundaries for a given world can be defined in a number of fashions. FIGS. 1A through 1C depict a relatively simple cubic-bounded coordinate system populated with a single cubic object. A given bounded volume can be subdivided in a number of fashions to provide different granularities. In FIG. 1A, the cubic object 112 fits exactly in a single cell of the coordinate system. FIG. 1B depicts the same object 112 in which the granularity has increased (i.e., in a system having a finer granularity). The conversion of the system of FIG. 1A to the system of FIG. 1B involves doubling the number of density of coordinate planes. Accordingly, as can be seen from FIG. 1B, the object 112 now occupies eight cells at the increased granularity. The granularity increase achieved in going from the system of FIG. 1A to the system of FIG. 1B can be applied in a recursive fashion, e.g., to subdivide each of the cells of FIG. 1B into eight equal cubes, a depicted in FIG. 1C. The octree data representation is used in several stages, including: data preprocessing 316, volume-based geometry simplification 346 view frustum culling 348 and cell occlusion (all discussed below in greater detail). The octree representation may be thought of as a hierarchy of nested cells or cubes. Each cell has 8 internal child cells whose sides are half the length of the corresponding side of the parent cells. There is no theoretical limit to the number of levels in the hierarchy but a practical limit is imposed by memory constraints.

The process can be repeated as many times a desired to achieve a "tree" of hierarchy of coordinate systems of ever-increasing granularity. In this example, because each recursion involves subdividing a unit cube into eight equal cubes, the series of increasing-granularity coordinate systems is referred to as an octree.

Figure 2A:
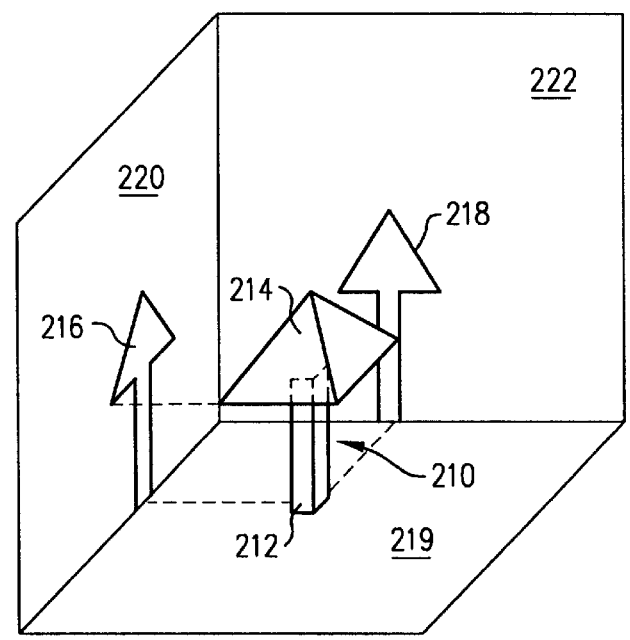
FIG. 2A depicts an example of a simple object of a type that may be displayed by the techniques of the present invention.

A series of increasing-granularity coordinate systems can be used to define different levels of detail, and an octree system is particularly useful in connection with the present invention, as will be clear from the description below. To illustrate the relation of granularity to multiple levels of detail, a simple object, depicted in FIG. 2A, will be provided as an example. The depicted object is a parallelepiped 212 surmounted by a pyramid 214. The three-dimensional shape and placement of the object can be better understood by noting the shape of the projections 216, 218, of the object 210, on the vertical bounding planes 220, 222. FIG. 2A also shows a horizontal bounding plane 219.

Figure 2B:
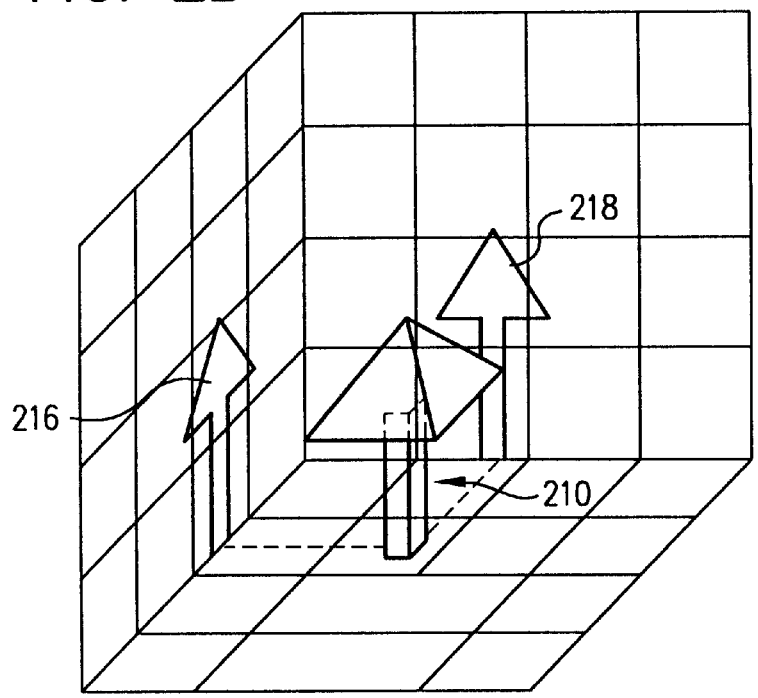
FIG. 2B depicts the object of FIG. 2A in a coordinate system with a first granularity.
Figure 2C:
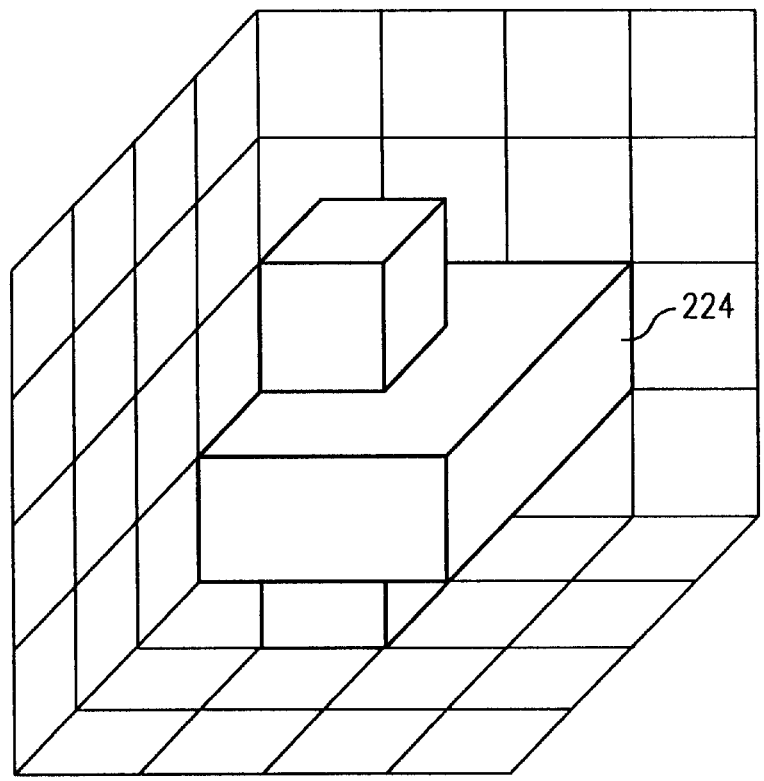
FIG. 2C depicts a simplified rendering of the object of FIG. 2A in a coordinate system having the granularity of FIG. 2B.

FIG. 2B depicts the object 210, positioned in a coordinate system having the granularity of FIG. 1A. As an example (and as will be described in greater detail below), a simplified rendering of the object 210 is depicted in FIG. 2C, in which the simplification is achieved by creating an object consisting of the faces of a plurality of the cells of the coordinate system, namely those cells which are intersected by a surface of the object 210.

Figure 2D:
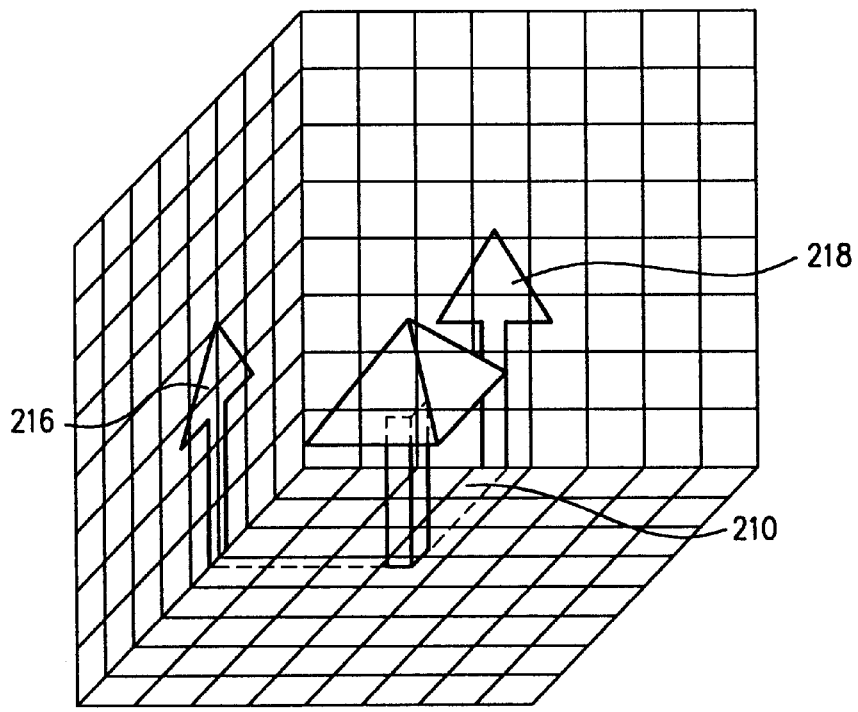
FIG. 2D depicts the object of FIG. 2A in a coordinate system having a second granularity.
Figure 2E:
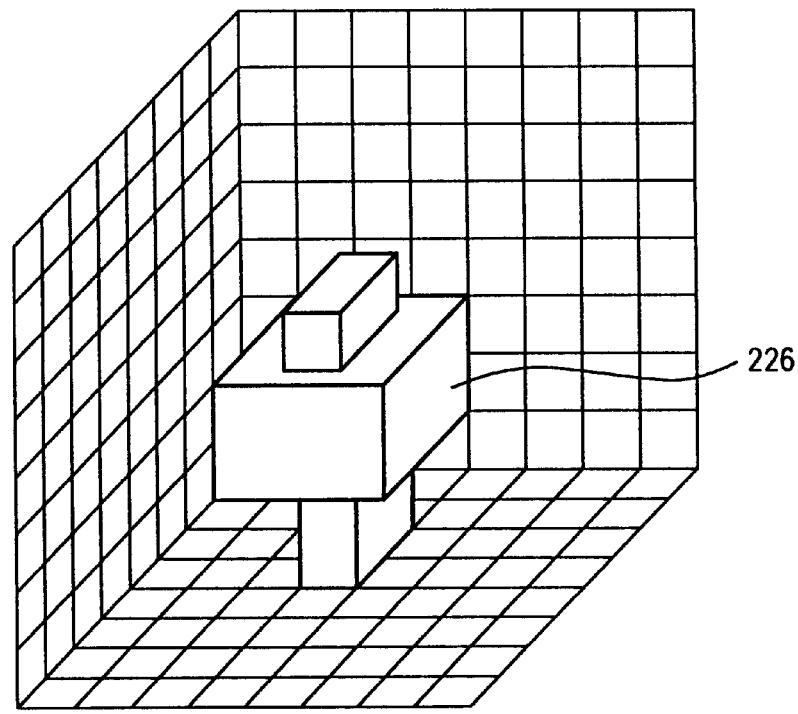
FIG. 2E depicts a simplified image of the object of FIG. 2A provided in a system having the granularity of FIG. 2D, according to an embodiment of the present invention.

FIG. 2D is similar to the depiction of FIG. 2B, but depicts the object 210 in a coordinate system having the granularity of FIG. 1B, i.e., the next-finer granularity in an octree system. When the same simplification technique used to create object 224 is applied in the finer-granularity system of FIG. 2D, the resultant simplified object, while still highly-simplified, bears a somewhat greater resemblance to the original object 210 than the coarser level of detail object 224. Thus, in each octree level or each increasing level of granularity, a finer level of detail of an object can be achieved.

FIG. 3 is a flow chart showing a general overview of a process according to one embodiment of the present invention. The process of FIG. 3 generally includes a first portion 312 containing steps that are performed prior to display of any images, and a second portion 314 which contains the steps used during image display. The first portion 312 includes pre-processing procedures 316 and data organization procedures 318. The goal of the pre-processing phase 316 is to convert the input data into a form that is relatively easy to load and manipulate at run time 314. Selecting or identifying the world 320 which the user desires to display establishes a finite volumetric boundary which will form the basis for subsequent spatial analysis. As will be described below, a given set of input data (a given collection of parts to be displayed) can be associated with two or more world views. Such as a first world view which shows the parts in a particular environment, a second world view which shows the parts in isolation, and the like. The world which is selected provides a central focus in the display environment, both from user's perspective and from the viewpoint of organizing the underlying data structures. The world is defined to establish boundaries that are useful to the user for a particular purpose. The world definition is used in managing the loading and unloading of part data, forms the basis for orienting the parts for viewing (e.g., rotating all parts with a common transformation) specifies the granularity of the level of detail (LOD) geometric simplifications, and specified color availability and precedence.

Color precedence data provides one way of selecting the color (or texture or "wallpaper") with which to color a given cell face, when a cell is occupied by two or more parts which are to be rendered in different colors. In one embodiment, a color precedence table is implemented as an array of color indices where the precedence is implicit in the array index (i.e., the color index associated with the first element in the array has the highest precedent, the second element has the second highest precedence, and so on). When two parts with different colors occupy a given cell, the cell faces will be colored with that color that has the highest precedence according to the color precedence table.

As noted above, the various parts which are to be depicted i the design system have shapes and locations that are mathematically (geometrically) defined. The data may be input in any a number of formats, including stereolithography (STL) format, an output format used by many computer-aided design (CAD) systems. The STL format defines the vertices of independent triangles that form (or approximately) the surface of the part. Normals to the triangles are defined on a facet basis (one normal for the three vertices that define the triangle face). Examples of formats that may be used for an input file include virtual reality markup language (VRML), and the unigraphics (UGU) solid pattern facet (FAC) file. The facet file format also defines independent triangles, with each triangle defined by three vertices and three normals.

Regardless of the format in which the part data is stored, in order to provide a common data form for pre-processing, a translator procedure extracts a list of triangles for each part from the input files 322. Although it is theoretically possible to use polygons other than triangles, triangles are preferred because of the simplicity and speed of processing. If the input data includes color information, the translator, in addition to extracting the list of polygons, can use the world's color table to convert the input color index into an RGB color specification. If no color input is provided, a default color index for the part can be generated. It may happen that some of the parts defined in the input files are not positioned anywhere within the boundaries defined by the world. Although cell files 326 will be defined for these parts, the list of intersecting cells will always be null and thus such parts will never be displayed for that particular world view.

Once the list of triangles for each part is obtained, certain groups of triangles may be combined or grouped into surface descriptions which can be optimized for rendering. This building of surface descriptions is referred to as "meshing" 324. According to one embodiment, meshing is performed by sorting the triangles and combining adjacent triangle edges. Preferably the meshing procedure is configured to accommodate double sided surfaces.

After meshing, if triangle normals are not already appropriately included in the input data (as they typically are, e.g. in for so-called "smooth" normals), triangle normals may be recalculated. If desired, the normals may be averaged for a given volume or mesh (i.e., in order to support smooth, shaded rendering).

To assist in efficiently displaying simplified views, (as described more fully below) for each part or component, it is determined, for at least one level of detail, which cells the surfaces of that part will intersect when the part is positioned in its defined location in the particular world view. For a pre-defined (preferably the finest) level of granularity of that world view 326. By defining intersections at the finest level of granularity, the intersection results can be propagated up through the octree hierarchy in an efficient manner, as described more fully below.

Figure 4:
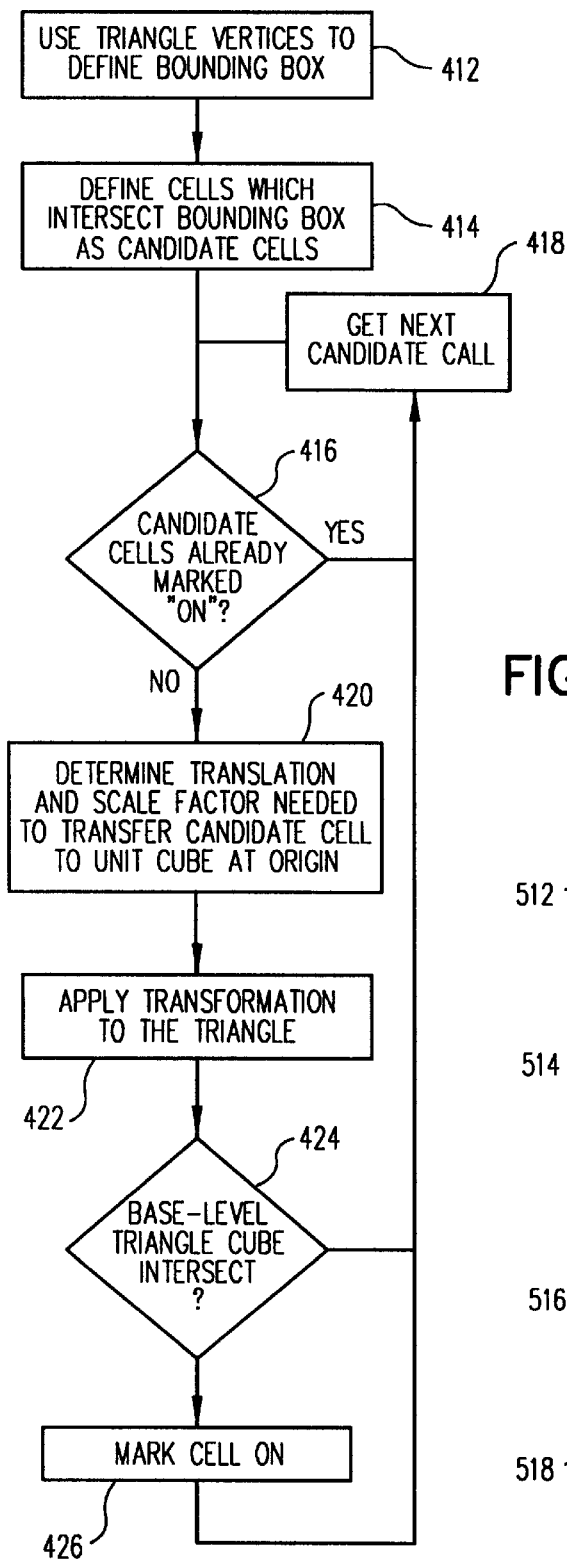
FIG. 4 is a flowchart depicting a process according to an embodiment of the present invention.

FIG. 4 depicts one manner of determining whether a given triangle intersects a cell. The triangle vertices are used to define a bounding box 412 of initial candidate cells at some level of granularity n where n is a coarser level of granularity than level m (the finest level of granularity available in the system), i.e. n<m. A recursive intersection test is performed until a list of candidate cells 414 at level m is obtained. Any candidate cells which are already marked "on" for that part 416 (i.e., cells that have already been determined to contain the part's surface as a result of analysis of another triangle of the part's surface) are ignored 418. Otherwise, the translation and scale factor that would be needed to transform each candidate cell (at whatever level) to the unit cube centered on the origin is determined 420. This transformation is then applied 422 to the triangle to test the transform triangle against a unit cube centered at the origin 424. Those cells that are determined to intersect are marked 426.

When the lists for each part are built, the data is output for data organization purposes. In one embodiment, cell intersections are represented in a 3-D run length encoded (3DRLE) format. The 3DRLE data is expressed as a set of minimum and maximum i, j, k, coordinates at a specified cell level in the octree data representation. The cell at the origin of the world (at each level) has i=0, j=0, j=0 coordinates. For example, 3DRLE data with the values (222333) at cell level 2 represents a cube that is composed of 8 level 2 cells. In this case, the same volume could equivalently be represented as (111111) at cell level 1, or (444777) at cell level 3. In general, it is always possible to represent a volume with smaller cells at another level. The converse representation only exists if cell boundary alignment conditions are satisfied.

Figure 5:
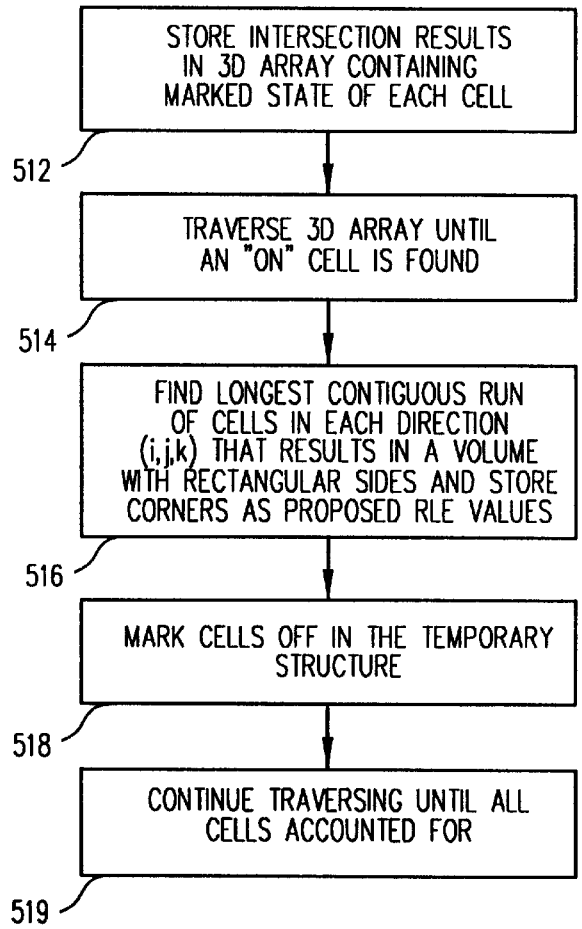
FIG. 5 is a flowchart depicting a process according to an embodiment of the present invention.

FIG. 5 depicts a procedure for constructing 3DRLE data. The intersection results from the procedure of FIG. 4 are stored in a temporary structure such as a data array (so-called 3-D array) containing the marked state of each cell 512. The temporary data structure is traversed, e.g., in the left-to-right, back-to-front, top-to-bottom manner, until an "on" cell is found 514. Once an on cell is found, the data is examined to find the longest contiguous run of cells in each direction (i, j, k) that results in a volume with rectangular sides 516. The corners of this volume are stored as a proposed RLE value. The cells identified in the previous step 516 are then marked "off" 518 and traversal of the temporary data structure continues until all cells have been examined 519.

In one embodiment, the data is output in a single data file. In another embodiment, the date is output in two separate files: a geometry file which stores the surface representation of the part (i.e., the meshes and their associated vertices and normals) and a cell file which contains the result of the spatial analysis (i.e., the list of cells that are intersected by the surfacer (not the volume) of the part. The geometry file is independent of the selection of the world. However, the cell file depends on both the world and the part geometry. Thus, if either the world or the part changes, the cell file needs to be updated.

Various formats can be used for the output file. FIGS. 6A and 6B depict formats for geometry and cell output files respectively, according to one embodiment. The geometry file includes a part name 612 the number of triangles 614 bounding box 616, the number of meshes 618, a color index 620, vertex data 622, mesh data 624, normal data 626, and end markers 628. The vertices and normals of the meshes are unique but may be referenced multiple times by meshes, thus avoiding data duplications. Multiple parts may be provided in a given file by repeating portion 612 through 626.

The cell files contain a version number 632, a world name or signature 634, an indication of the cell level for the data 636, the name of the part 638, the RLE data 642, and end markers 634. It is noted that the vertices and normals for each part are stored in separate arrays. Each mesh 624 is an array of alternating normal and vertex indices that sequentially define the points on the surface of the mesh. Multiple parts per file can be supported by repeating portion 632–644. The world signature 634 preferably includes the minimum and maximum coordinates of the world bounding box, the maximum cell level for comparison with the cell file 3DRLE cell level at load time viewing rotations about the XYZ axis.

The depicted organization is particularly useful when using the geometry files for rendering the part in full detail 342. For full detail rendering, each mesh is processed, the normals and vertices for each point on the mesh are dereferenced (via the indices) and the XYZ components of both the normals and vertices 626, 622 are sent to the graphics system for rendering.

After the data output files are constructed, certain data organization is performed to assist in later processing. Preferably a cell-to-part mapping is performed 328, i.e., for each cell, a list of those parts that reside or intersect that cell is formed. In one embodiment this mapping is performed for only a single octree hierarchy level, (e.g., level 5 in a 7-level system). Although there is no theoretical reason why the mapping could not be performed for multiple levels, a single level typically suffices for the purpose of full detail rendering and avoids using an undue amount of memory. The cell-to-part mapping 328 is used in the full detail rendering 342. As noted below, view frustum culling 348 is used to define a set of cells that will be within the "cone" of visibility for a given virtual camera position and other cells are "culled out." This cell culling can be used whether simplified rendering 346 or full detail 342 is being performed. If full detail is being performed, it will be necessary to know, for those cells which are within the view area, which parts are within those cells, and this is the purpose of the cell-to-part mapping 328. If a part intersects more than one cell it will be referenced in the cell-to-part mapping for each cell. If view frustum culling identifies cells at a different level from that of the cell-to-part mapping, the octree data representation is traversed (as discussed below) to collect the list of parts from the cell-to-part mapping.

In the depicted embodiment, each cell in the octree has an associated color index 332. The value of this color index is determined by the color indices of the parts contained in the cell 620 and the world color precedence table, discussed above. In one embodiment, a byte is associated with each cell to contain both the color mapping 332 and an indication of whether that cell is "on" or "off" 334. Since a byte can contain 256 different values, the byte can be used to indicate up to 255 colors, with the last "color" being used to mark an off state (color is only meaningful for those cells that are marked on).

Once cell data indicating color and on/off status for each cell at the finest level of detail (finest granularity) has been stored, this data can be used for rendering simplified representations at any higher level by a relatively simple and rapid propagation method. Starting with the lowest level (finest granularity) octree, the next-coarser granularity octree can be populated by marking a parent cell "on" if any one of the child cells is marked on. If two different child cells have two different colors, the parent cell color will be determined by the color priority table.

Additional information may be stored for each cell for various purposes. A one-byte "octcode" data type may be used to define a particular child of a parent cell in the octree data representation (each bit in the byte corresponds to a specific one of the 8 child cells). As discussed more thoroughly below, bit shift operations can be used in conjunctions with the octcodes to traverse to child cells.

Another byte ("octlist") can be used to define a state for each child cell of a parent. For example, this byte can be used to encode which children cells of a given parent cell are marked on or off.

In a number of operations (described below) it is useful to traverse the octree hierarchy, i.e., to be able to start with a given cell at a given octree hierarchy level and rapidly determine those cells that are parent or child cells in the next-higher or next-lower octree hierarchy level. Preferably both traversal upward (traversal to an ancestor) and downward (traversal to descendants) can be achieved. In order to determine the destination cell index, bit shift operations can be used on each of the i, j, k, components of the current cell index. A cell index of an immediate ancestor (parent) is calculated by applying a right shift of one bit to the current cell index. In general, for an ancestor N level above, a right shift of N bits is used. To calculate the cell index of an immediate descendant (child) the current cell index is left shifted one bit and the octcode of the specified child is used to determine if the vacated right bit should be toggled (from 0 to 1).

In one embodiment a flag may be associated with each cell to indicate if all descendants are marked on. In certain embodiments, described below, cell rendering can be more rapid by rendering a single parent cell instead of 8 child cells, if all of the child cells are "on."

In some embodiments a density map 336 is provided for storing the number of descendent cells at a particular level that are marked on. A density map can be used in a fashion similar to the cell attribute flag discussed above i.e., it may be useful in some cases to render a parent cell even if not all child cells are "on" provided at least a certain minimum number of the child cells are on.

After the first portion 312 has been completed, the system is prepared to begin displaying in a fly-through interactive three-dimensional fashion 314. In one embodiment, the user presses a mouse button and points the cursor in the direction desired, in order to initiate fly-through. To start the display 338, preferably the user is permitted to set certain parameters for the display such as the level of detail and/or the frame rate. Because of the interaction between the level of detail and the frame rate (the finer level of detail, the slower the maximum frame rate that can be achieved), in some embodiments, the user may be permitted to select one parameter which will control value of the outer (or to select a range or certain discrete values). In one embodiment, the user may select a desired level of detail and the system will thereupon render some or all portions of the view at a level of detail which is equal to or finer than the specified level and will adjust the frame rate as needed to maintain this level of detail. In another embodiment, the user may specify that the frame rate should never fall below a specified value and system will automatically render in those levels of detail necessary to maintain the minimum frame rate.

In some embodiments it is desired to maintain some representation of all parts that are visible in the scene. In other embodiments, it may be desirable to discontinue certain visible cell representations (e.g., those in the distant background) in order to achieve certain rendering performance gains.

There are some situations in which the time required to draw a simplified version of a part might be longer than the time required to draw the part in full detail (e.g., a part with a large surface area defined by large triangles). In some embodiments, (particularly when the number of parts is relatively small) these situations are identified on a part-by-part basis and a more rapid rendering method is selected. In another embodiment, no account is taken of this possibility and simplified representations are presumed to take less time than a full-detail representation of a given part.

In one embodiment, a part, especially a large or complex part, may be "split" (i.e. treated as two or more parts) in order to improve rendering performance. Preferably any such splitting will be accommodated during the preprocessing 316 or data organization 318 phases, i.e. before image generation occurs. The criteria for splitting the part can be based on the spatial location of individual polygons relative to this axis-aligned cell boundaries that intersect the part. All of the sub-parts that result from this processing are present in the cell-to-part mappings contained in the cells. In general, this will increase the memory requirement for the cell-to-part mappings since there are now more parts (i.e. one part is split into multiple sub-parts) that span the same volume of space. However, rendering performance is improved in cases when the view frustum only intersects a portion of the original part because only the sub-parts within the view frustum need be rendered as opposed to the entire part.

Preferably simplified representation of parts are drawn in the background portion of a scene and at least some detailed rendering is maintained for those parts relatively close to the virtual camera, when possible.

In a typical situation, simplified rendering is necessary only when the camera is moving, i.e., during a "fly-through" procedure. Thus, if the camera is not moving 340, the scene will be rendered in full detail 342. If the camera is in motion, (i.e., if the user is providing input via a mouse, joystick, etc., indicating the user's desire to move the view point or "virtual camera" the system will then determine whether it is time for a new frame 343. At any given time, a frame rate is in effect. For example, in one embodiment a frame rate of 10 frames per second or more is preferably maintained.

If it is determined that anew frame is to be rendered, the system will calculate the point of view for that frame. The point of view will depend upon, for example, the input being provided by the user (where the user is placing the mouse or cursor). In one embodiment, the user can set a desired flight speed. Preferably a default speed is defined and only certain speed increments are permitted. Preferably the default speed and speed increments are established based on the extent of the current world. In some cases, however, it is desired to control the apparent acceleration and/or velocity of the virtual camera 344. In one embodiment if the viewpoint was previously static and the user has requested movement to a new location, it is preferred, in some embodiments, to limit the apparent acceleration of the camera so that there is no appearance of "infinite" acceleration from a static position, instantaneously, to a moving status, since such instantaneous acceleration may make it difficult for a user to properly navigate through the scenes (e.g., may result in overshooting or under-shooting). Thus in one embodiment, within the constraints of limits on acceleration, the new point of view is calculated based on the user input 344. Preferably virtual camera positions are determined as a function of acceleration and velocity. Acceleration is particularly important for fine-grained motion control, when close to parts of interest. Preferably a velocity maximum is pre-defined and thus acceleration is only important until the maximum velocity is obtained. Deceleration, in one embodiment, is allowed to be instantaneous, i.e., is a step function, unlike acceleration which is a ramp function. The distance the virtual camera travels between frames is a function of the current velocity and the elapsed time. If the target frame rate is achieved, then the current velocity and the actual elapsed time are used to calculate the camera position. If not, then an ideal elapsed time (based on the target frame rate) is used instead of the actual elapsed time. This prevents "jumps" in the camera position when the frame rate decreases.

Figure 7A:
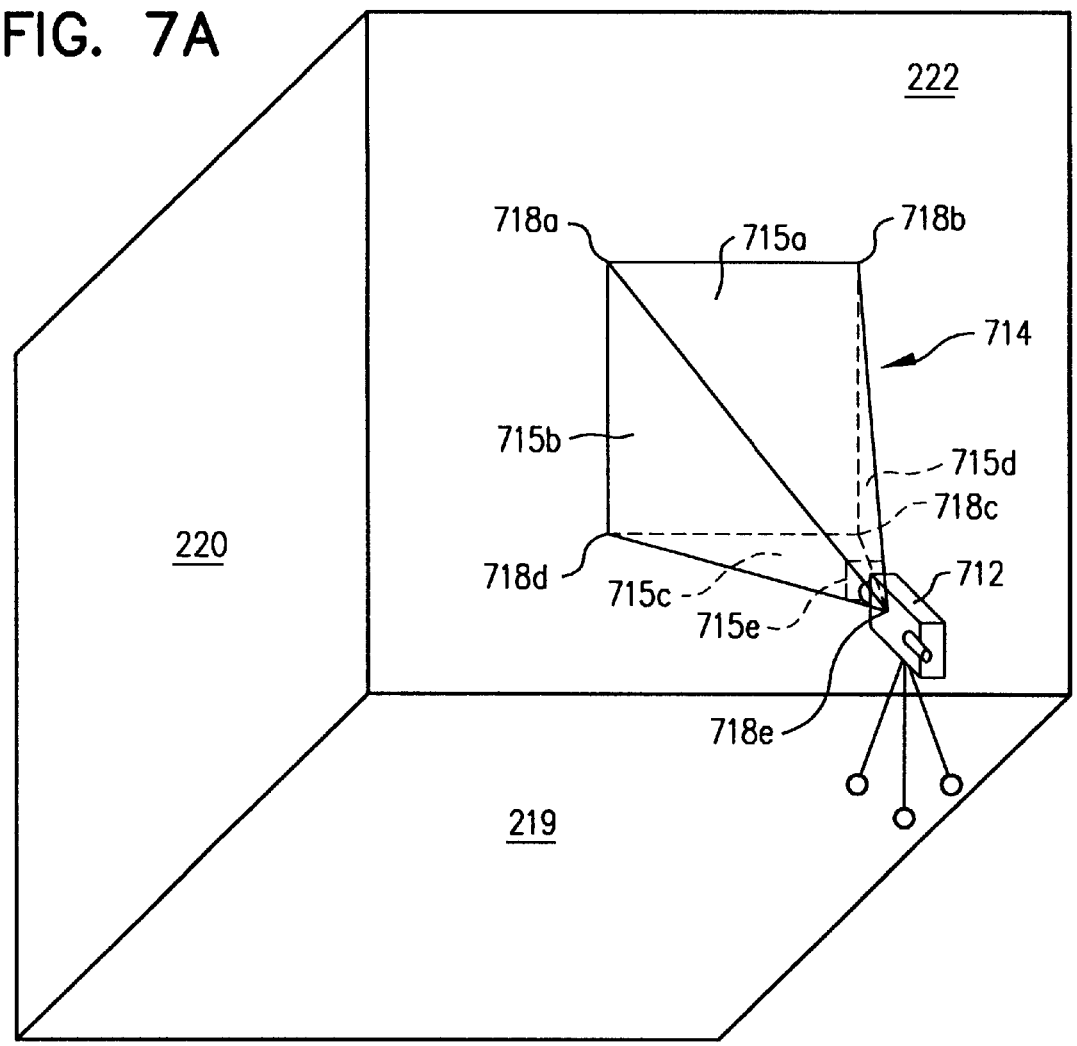
FIG. 7A is a schematic perspective view depicting a view frustum according to an embodiment of the present invention.
Figure 7B:
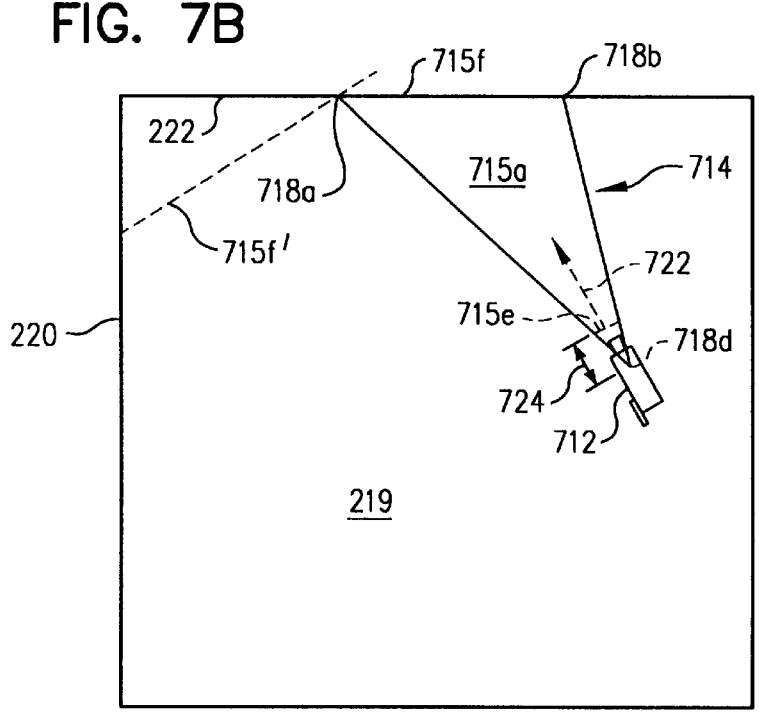
FIG. 7B is a top plan view of the region of FIG. 7A.

As noted above, one of the techniques used to reduce computational requirements is view frustum culling. The idea behind view frustum culling is schematically illustrated in FIG. 7. If it is assumed that the virtual camera 712 is positioned as shown in FIG. 7, the view which would be seen by such virtual camera defines a volume which generally has the shape of a truncated pyramid 714 bounded by four view frustum planes 715a, 715b, 715c, 715d and near and far bounding planes 715e, 715f. Accordingly, in the situation depicted in FIG. 7, the scene can be adequately rendered by rendering only those parts (either in full detail or in simplified fashion) which lie within the frustum 714 and "culling" volumes outside that cone 714. According to one embodiment, view frustum culling is achieved in a fashion which is hierarchical, tightly integrated with the octree data representation, incremental (supports collecting cells one "slice" at a time), designed to produce a tight cell fit at the boundaries of the cone frustum 714, and is based on optimized plane or cell intersection tests.

Figure 8:
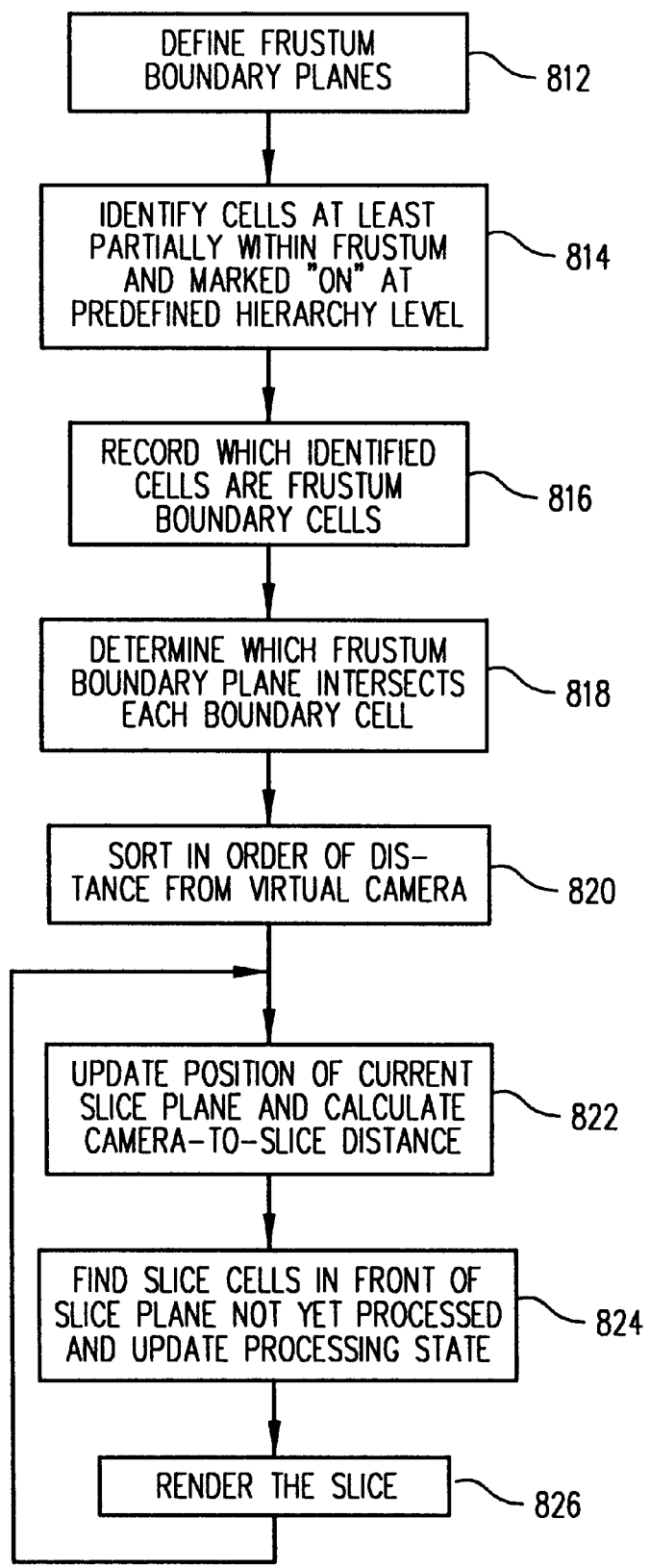
FIG. 8 is a flowchart depicting a process according to an embodiment of the present invention.

FIG. 8 depicts a process for a view frustum culling procedure according to an embodiment of the present invention. As depicted in FIG. 8, after defining the planes that bound the view frustum 812, cells are identified which are at least partially inside the view frustum and are marked "on" 814. This analysis is, in one embodiment, performed at a single pre-defined octree hierarchy level, such as level 5. Those identified cells which are frustum boundary cells are recorded 816, and it is determined which frustum boundary plane intersects each boundary cell 818. In one embodiment, in order to determine if a cell is within the frustum, a plane/cell corner test is used. Preferably, the cell-in-volume test can be performed with no more than 12 inequalities. The test reveals if a point (the cell corner) is in front of or behind a plane. This test can be performed using a simple dot product and thus is relatively rapid and easy to execute. According to this test, if the corner of the cell closest to the plane (assuming the cell is in front of the plane) is selected for the test, the results can be extrapolated to determine if a cell is completely or possibly partially in front of a plane. To determine if a cell intersects a plane, these results are combined with a second test where the orientation is reversed. In this second test, the normal on the other side of the plane is used to establish the forward direction and a new cell corner is used. If either test reveals that a cell is in front of the plane, then the cell does not intersect the plane. If both tests indicate the cell is partially in front of the plane, then the cell intersects the plane. For cells close to the position of the virtual camera, an axis-aligned plane (roughly coplanar with the far clipping plane) is used to exclude cells directly behind the virtual camera position.

The cells are sorted in order of distance from the virtual camera 820. As described below, scene processing is performed slice-wise. The slice planes can be defined in a number of fashions. In one embodiment slice planes are defined as parallel to the far clipping plane (i.e., the bounding plane of the view frustum). Sort distance can be calculated as the dot product over the norm. The position of the current slice plane is updated. The distance from the virtual camera to this plane is calculated 822. The slice planes are used to incrementally partition the scene so it can be processed one-slice-at-a-time in a front-to-back order. Next, those slice cells which are in front of the slice plane but have not been completely processed are located 824. This is done by comparing the distances from the virtual camera to the cell and the slice plane. The cell level which is required is determined by the level of detail that will be used for rendering the current slice. It is common for the cells collected at the pre-defined level to be traversed in order to find descendent (smaller) slice cells. When traversing the hierarchy to find descendant slice cells, the cell type (interior or boundary) and plane mask (indicating which boundary planes intersect the cell) are used extensively. Specifically, if the cell type is "interior," then there is no need to test the descendent cell against the boundary planes of the new frustum. If the cell type is "boundary," then the plane mask is used to optimize the boundary testing. The cell processing state is updated at the conclusion of this step. "Processing state" is an indication, for a given cell, of whether processing has not started, has been partially completed, or is complete. For example, if all of the cell descendants have been allocated to slices, then the cell is updated to indicate processing is complete. At this point the slice is rendered 826 and the position of the slice plane is updated 822 in order to continue processing. The last slice plane does not need to be defined, since collecting all of the non-completed cells is preferably supported.

A number of aspects of the frustum culling can be used to improve or maintain performance. By making an assumption that the near clipping plane (the view plane immediately in front of the camera) is close to the position of the virtual camera, the view frustum boundary can be defined by five points 718a, 718b, 718c, 718d, 718e ( i.e., a pyramid) (rather than eight points that would be required to define a truncated pyramid).

The five-point view frustum boundary can be used to define the perspective transformation for the underlying graphics system (e.g. OpenGL). In one embodiment the far clipping plane 715f is coincident with the five-point view frustum plane that is perpendicular to the virtual camera look direction 722 (i.e. the base of the pyramid). The near clipping plane 715e is positioned slightly in front of the virtual camera at a distance 724 that is proportional to the size of the five-point view frustum.

In another embodiment the near and far clipping planes are positioned dynamically based on the part(s) (i.e. the cells that have non-null cell-to-art mappings) that are present within the five-point view frustum boundary 714. The near and far clipping planes are positioned as close to the part(s) as possible without actually clipping any of the part(s) from the resulting image that is generated. This clip plane "clamping" reduces the distance between the clipping planes and improves the z-buffer resolution of the graphics system. This is turn improves the accuracy of the graphics selection mechanism. Furthermore, surfaces that are close together are displayed more precisely (with respect to how the surfaces occlude each other). The actual position of the clipping planes is determined after the cells have been sorted in order of distance from the virtual camera and before any primitives are sent to the graphics system for rendering. The closest point on the closest cell (with a non-null cell-to-part mapping) to the virtual camera is used to position the near clipping plane. In a similar fashion, the farthest point on the farthest cell (again with a non-null cell-to-part mapping) is used to position the far clipping plane. Since the cells are already sorted for the subsequent scene processing, this procedure can be used at interactive frame rates.

Once view frustum culling is performed 348 and it is known which cells need to be rendered, scene processing is used 352 to provide procedures intended to deliver the "best" (substantially most useful or pleasing) image possible with the available resources. In general, the scene is rendered 354 in slices from front to back. This spatial partitioning divides the work to be done, allows slice primitives to be sent to the graphics pipeline early in the processing sequence (i.e., drawing starts before the entire scene is processed), sets implicit priorities (i.e., the slices in front may be rendered in greater detail than those behind), and allows rendering progress to be monitored. A rendering slice is a set of cells that is processed and drawn together. Typically a slice contains all of the cells that are within some distance from the virtual camera. In one embodiment, a single level of detail is used for any given slice. As used hereinafter, a "region" is the largest spatially contiguous set of slices in a scene that share a an LOD.

Monitoring the time which is spent rendering is useful in controlling the LOD transitions and provides a natural checkpoint for testing if the user has requested an interrupt (e.g., in a static scene). As noted above, a motion scene is drawn while the camera is in motion. The goal is to provide enough visual detail to permit navigation while still maintaining high frame rates. Typically a motion scene is composed of multiple regions, each with a different level of detail. The region with the finest level of detail (in some cases full detail) is closest to the virtual camera and the coarsest LOD is the farthest away. Static scenes on the other hand are drawn when the camera stops moving. The goal is to render the entire scene in full detail. Preferably, interrupts are supported to allow a user to pause briefly and resume moving the virtual camera, without waiting for the static scene to be drawn completely.

In one embodiment, the time available for drawing a scene (the reciprocal of the frame rate) is allocated according to a precalculated region-time-distribution. This distribution essentially determines what percentage of the available time will be spend in each region, in order to produce the most useful image. The available rendering time is bounded by the requested frame rate. The distributions are based partly on the number of LOD settings. For example, if the user has specified that a motion scene can use three different LOD settings, the time may be distributed such that 70% of the time is used in the first region employing the finest level of detail, 20% in the second region and 10% in the third region at the lowest level of detail.

Multiple region-time-distributions are provided for each possible level of detail count in order to address the variation of drawing complexity and machine capability. In one embodiment, these are ordered in tables so entries for low drawing complexity/high machine capability combinations are first, and high drawing complexity/low machine capability combinations are last. In one embodiment, an indication of the drawing complexity is divided by an indication of the machine capability and the result is used as an index into this table. A number of items can be used to indicate drawing complexity. In one embodiment, the approximate number of polygons that were drawn in the previous frame is used. This approach is based on the existence of a certain amount of frame-to-frame coherence and provides the advantage of avoiding spending time determining a polygon count for the current frame. The polygons for each part are known from the data pre-processing phase 316, and the polygons used to draw cells can be readily collected. One manner of indicating the machine capability is to base a metric on the number of polygons the machine can render per unit time. The machine capability factor may be calculated (or automatically updated) based on statistics gathered during use or may be manually set (effectively allowing the user to "push" the full detail boundary farther back into the scene).

The processing for both motion and static scenes is similar except that when a motion scene starts to run out of time, compromises are made in image quality (i.e., the remaining regions are assigned coarser LOD). When a static scene runs out of time, drawing is interrupted to determine if the user has requested an interrupt (the static scene code is re-entrant).

Figure 9:
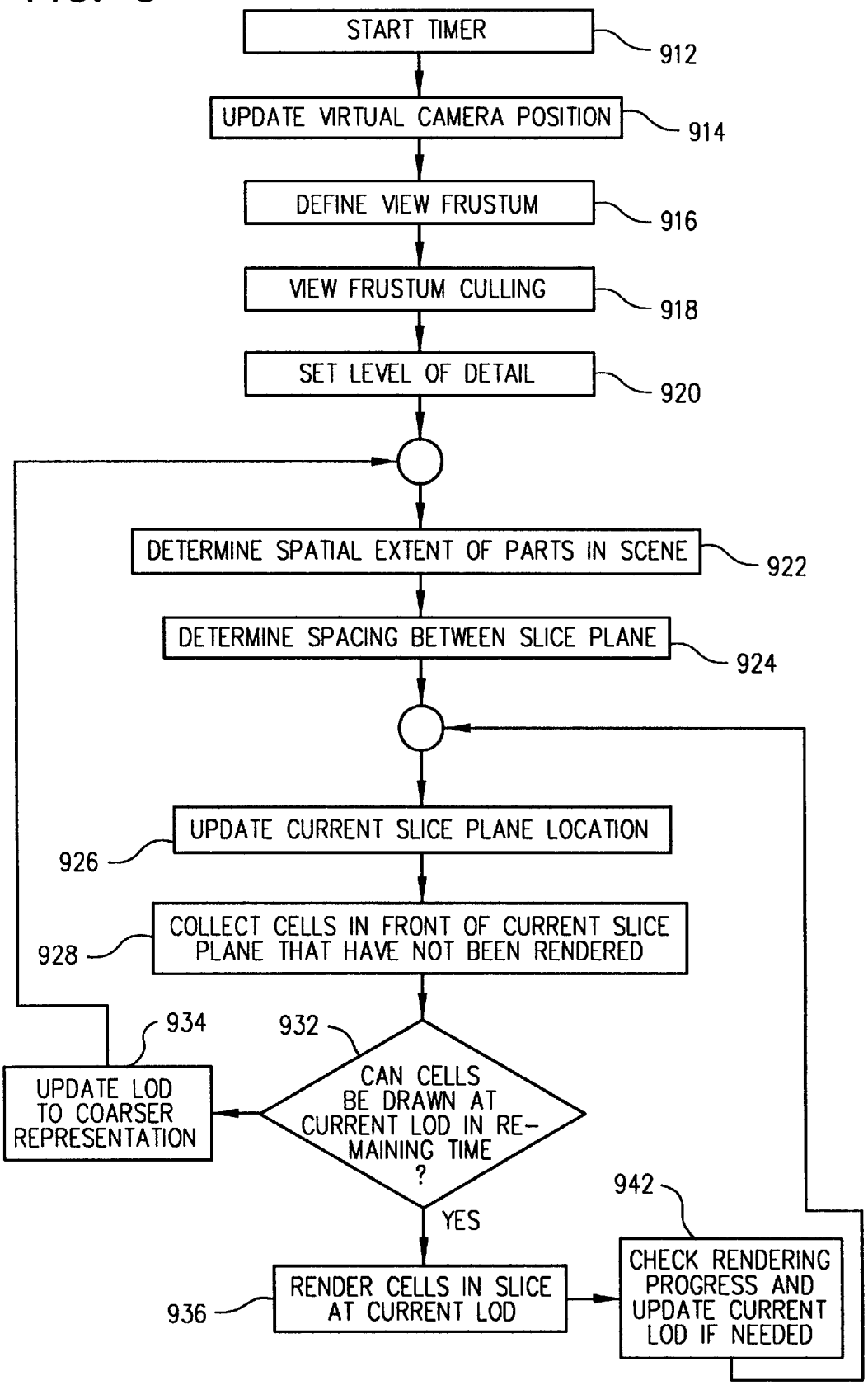
FIG. 9 is a flowchart depicting a process according to an embodiment of the present invention.

FIG. 9 depicts a scene processing algorithm according to in one embodiment of the present invention. At the beginning of the procedure a timer is started 912. The virtual camera position is updated 914 and the view frustum is defined 916. The view frustum culling is performed 918 (e.g., a depicted in FIG. 8) and the region-time-distribution table is consulted to set the current level of detail 920. A spatial extent of the parts in the scene is determined 922. This can be done in a number of fashions. In one embodiment, two boundaries are defined by planes parallel to the far clipping plane. In other embodiments, it may be desirable to calculate density or complexity maps for this purpose. The spacing between slice planes is determined 924. Proper spacing is useful to avoid excessive processing overhead. Preferably the spacing is based on the current LOD (920). For example, if octree hierarchy level 5 is currently being rendered, then the slice plane spacing is set based on the size of a level 5 cell. The current slice plane location is updated (based on a previous plane location and current spacing 926). The cells in front of the current slice plane that have not yet been rendered are identified 928. As noted above, the view frustum culling algorithm provides this list of cells. At this point, a prediction is performed to determine if the cells can be drawn at the current LOD within the time remaining for the current region 932. If not, the LOD is updated to a coarser representation 934. The prediction is based on the region-time-distribution table and the value of the timer 912. If the cells can be drawn at the current LOD, the cells are rendered 936. Rendering progress is checked and the current LOD will be updated if necessary 942.

In one embodiment, the user can specify a "focal length" which defines the distance from the virtual camera to the boundary between a first LOD region and a second region at another (e.g. coarser) LOD. If desired, this focal length can controlled exclusively by the user and can be configured so that it is not influenced by the parts present in the current scene. The scene processing algorithm proceeds normally, but with the additional constraint that the boundary between the first two regions is dictated by the focal length, not the time remaining for rendering a particular region. If all of the parts are within the focal length distance from the virtual camera they are rendered in the first region at the finer LOD. If all of the parts are beyond the focal length distance, none of them are rendered at the first LOD specified by the user. Once the current slice plane is beyond the focal length distance, the region-time-distribution tables are used to guide the scene processing algorithm and the focal length constraint is no longer in effect. This focal length control gives users greater control over the final image quality.

The rendering of the scene (i.e., attending to display of an image on the display screen) is performed differently depending on whether the simplified 346 or full detail 342 scene is being rendered. Certain features are in common, however. A number of communication channels can be used for rendering, such as the X-Window system or, preferably, the Open GL pipeline. Open GL is software which is available from Silicon Graphics, Inc. Preferably, double buffering is used so the current frame can be displayed while the next frame is being composed. This ensures that only completed frames are seen and aids in performance. In both instances, z-buffering techniques known to those of skill in the art are available to support hidden surface removal. The scene can be rendered to simulate various directions of lighting, including ambient light and/or a positional light. In one embodiment, the positional light moves with the virtual camera and is offset to an elevated value (i.e., along the y axis) to provide more realistic lighting and avoid glare. In one embodiment, flat shading is used. In another embodiment, smooth shading is used. The graphics window is preferably implemented by a GlwM drawing area widget, available from Silicon Graphics, Inc. It provides a window with the appropriate visual and color maps needed for Open GL based on supplied parameters.

Full detail rendering 342 uses data which is organized such that each part has one or more meshes (defined by referencing normal and vertex indices), a normal array and a vertex array that the meshes reference and a color. Preferably a default set of material properties is applied to all parts. A frame number counter is initialized at the start of each session and is incremented each time a frame is drawn. In one embodiment the current frame number is used as a flag in data structures to indicate that work for the frame is complete. This technique is used to identify the parts that have been drawn in a particular frame. This alleviates the need to maintain a list of drawn parts and ensures that part rendering will not be duplicated in a single frame.

Figure 10:
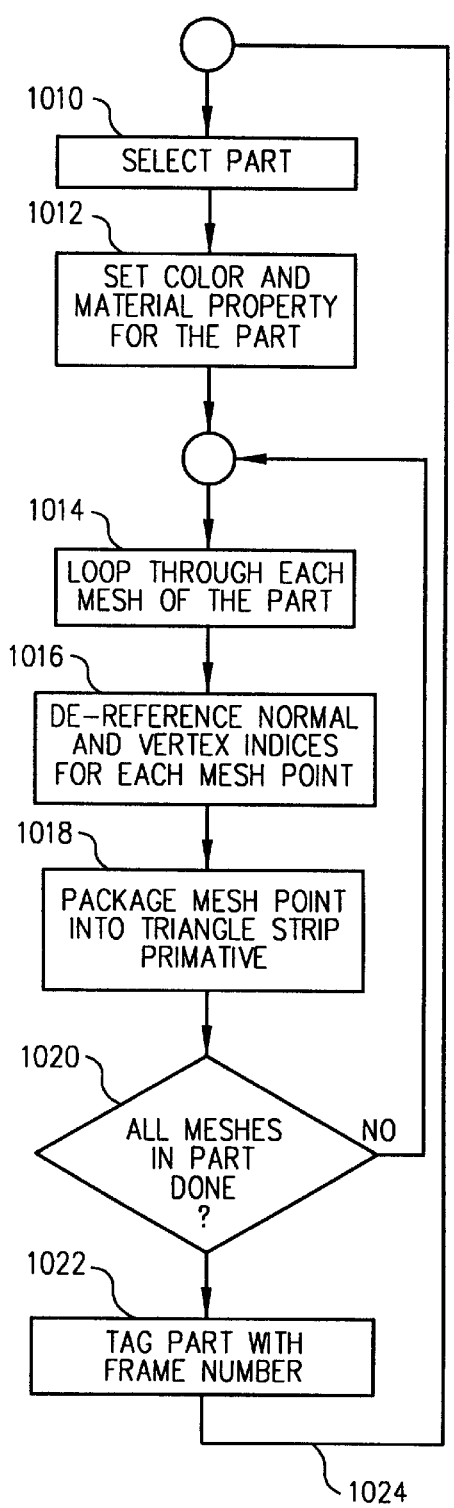
FIG. 10 is a flowchart depicting a process according to an embodiment of the present invention.

FIG. 10 depicts a full detail rendering process according to an embodiment of present invention. After setting the color and material properties for the part 1012, the procedure loops through each mesh in the part 1014. The normal and vertex indices for each mesh point are dereferenced 1016 and the mesh points are packaged in the fashion supported by the particular communication channel for rendering this is being used. If open GL is being used, the mesh points are packaged into a triangle strip primitive 1018. After each mesh in the part has been completed 1020, the part is tagged with the current frame number 1022 to indicate that the rendering of the part has been completed and the system loops 1024 to select the next part 1010.

Figure 11:
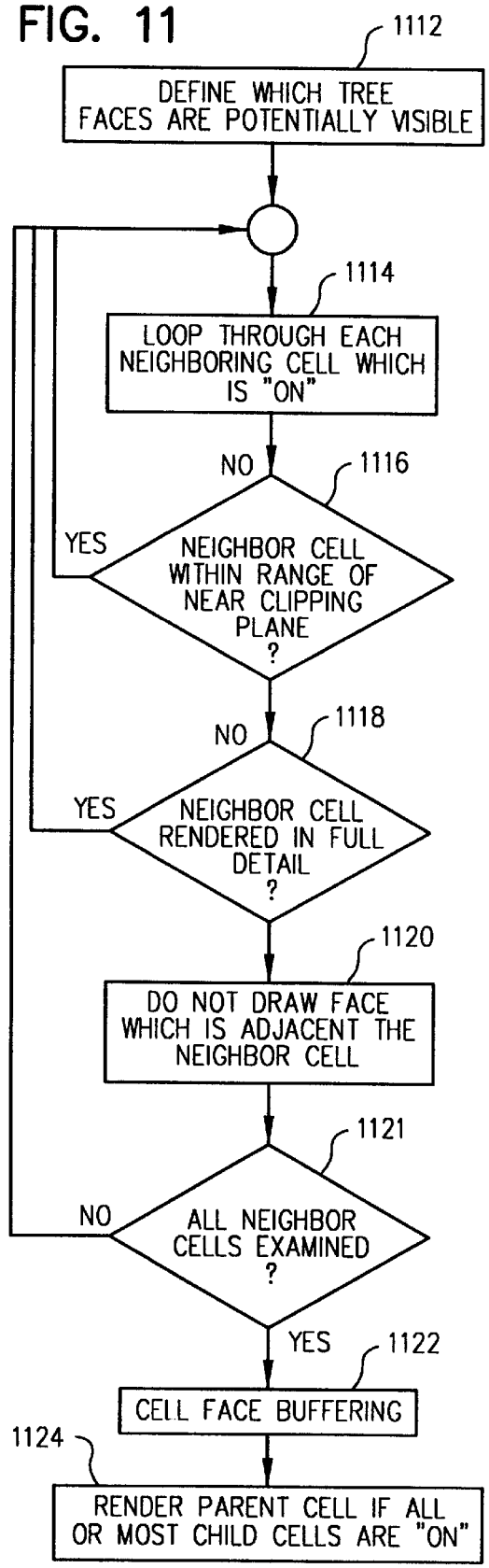
FIG. 11 is a flowchart depicting a process according to an embodiment of the present invention.

The simplified cell rendering procedure 354 is preferably configured so as to draw the minimum number of cell faces to present a facade that is visually identical to the image that would result from drawing all six faces of each cell. At most, only three faces of a cell are visible from any orientation (assuming no stereoscopic viewing). As depicted in FIG. 11, one of the first steps in cell rendering is to determine which three faces of a cell are potentially visible 1112. This is a function of a position of the virtual camera relative to the cells. To further reduce the number of cell faces that are rendered, faces that have an adjacent neighbor 1121 (a cell that contains one or more parts) do not need to be drawn in most cases 1116. This is due to the fact that if the neighboring cell is drawn, it is guaranteed to occlude the cell face. To assure that a cell neighbor will occlude, a number of steps should be taken. Neighbor cells within the range of the near clipping plane (near the apex of the view frustum for the current camera position) are invalidated as potentially occluding cells. Otherwise, gaps in the cell faces may be seen where the near plane clips drawn cell faces (of the neighbors) from the resulting image. To simplify the calculation, a range of cell coordinates at each level is determined that effectively acts as a bounding box for the near clipping plane. When the cell neighbor check is performed, the cell coordinates of the neighbor are preferably compared against this range (instead of, e.g. performing a time-consuming distance calculation). If the neighbor cell is too close to the virtual camera, the candidate cell face is drawn (i.e., there is no assumption of cell neighbor occlusion).

When rendering multiple levels of detail, it becomes important to know how a neighbor cell will be rendered. For example, if the neighbor cell is rendered in full detail (i.e., the parts in the cell are to be drawn, not the cell itself), then the cell cannot be used as a neighbor cell in the cell neighbor occlusion algorithms since there is no guarantee that the candidate cell face is occluded 1118. To handle this case, the data structures preferably store the LOD used to render cells. Unless a neighbor cell is invalidated by steps 1116 or 1118, cell faces with an adjacent neighbor are not drawn 1120.

In order to improve rendering, the cell faces are collected in a buffer 1122 until an optimal number are present, whereupon the buffer is flushed. This is accomplished, in one embodiment, by sending quad primitives for each cell face to the graphics pipeline. When Open GL systems are used, all the primitives are enclosed in one Open GL begin/end pair to reduce the overhead of the graphics calls. The cell face buffer contains, for each cell face, vertex coordinates, an index for the associated normal, and the color index. Preferably, to avoid redundant state changes, color changes are not only sent to the graphics pipeline each time the buffer is flushed (at the beginning) and when cell faces change color. This process can also be repeated for cell material properties such as specular properties and shininess properties. In one embodiment, specular and shininess properties are held constant. The size of the cell face buffer can be determined empirically, if desired. Preferably, the size should be sufficient to provide a optimal or reasonable number of quad primitives per begin/end package on the particular target hardware. In one embodiment, the buffer is 500 (quad primatives). Preferably, if all of the child cells of a particular parent cell are marked "on," 1114 the parent cell is rendered rather than the individual child cells 1124. The total size of the rendered cells is the same in either case, but when the parent cell is drawn the number of graphics primitives and code traversal is reduced. The potential disadvantage is that the parent cell will be drawing with a single color (determined from a color precedence table) whereas they may be different colors for the various child cells.

In one embodiment, cell face masks are used to maintain the list of faces that need to be drawn for a cell. In one embodiment, this mask may be implemented as a byte data type. Preferably, a mapping convention defines the bits of that byte which are associated with each of the six cell faces. The cell face mask is initiated with the three visible faces of the cell and these are subsequently pruned (if possible) as the algorithm 1114–1124 proceeds.

As noted above, the frame rate is important to how the rendered scene will appear during fly-through. Preferably, frame rate is controlled 356 to maintain a constant frame rate, or to at least bound the rate of change. In one embodiment, both predictive and reactive techniques are used to achieve this goal. (356)

Figure 12:
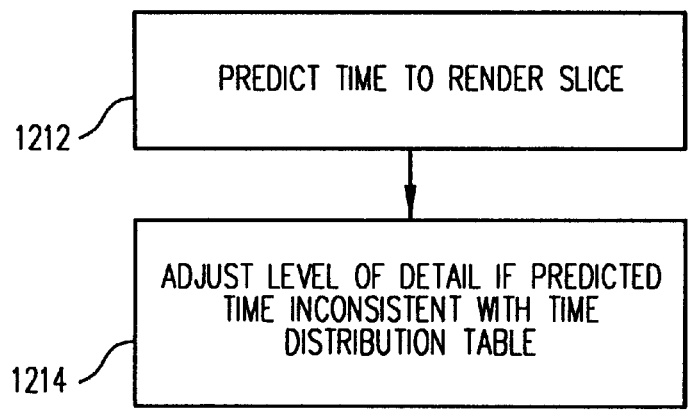
FIG. 12 is a flowchart depicting a process according to an embodiment of the present invention.

Predictive techniques for supporting relatively high virtual camera velocities and rotations, particularly in worlds that have a wide range of graphical complexities (i.e., many parts in some areas and few in others). This approach assumes that the information gleaned from rendering the last frame is not sufficient for rendering the best image for the current frame. According to one embodiment, the time required to render a slice at the current LOD is predicted 1212 (FIG. 12) and this prediction is used as basis for deciding if the current LOD should be updated before drawing (i.e., if the drawing will take too long) 1214. Both the polygon draw rate and the pixel fill rate factor into these slice predictions. As noted above, the polygon draw rate is calculated by dividing the number of polygons in the slice by the tendering capability of the targeting machine. According to one embodiment, the pixel fill rate is based on the projected area of the parts and images space relative to the size of the view port. The target machine pixel fill rate is used to determine the time required to pixel-fill the entire view port. Therefore, the time needed to pixel-fill the part is some percentage of the time required to pixel-fill the entire view port. The face of the part-bounding box (roughly perpendicular and closest to the virtual camera) is used to approximate the projected area of a part. Although this is a rough approximation, it is relatively rapid to obtain. The pixel fill rate is particular important for low end machines with software (not hardware) graphic support.

Reactive techniques are used, e.g., to automatically adjust parameters (used in the predictive estimates) e.g., to fine tune for machine load. The reactive techniques essentially form a dynamic feedback loop and it may be useful to provide damping, e.g., in order to prevent oscillations (e.g., visual flashing) in the LOD boundaries within the scene. Damping, in one embodiment, can be achieved by accumulating results over a number of frames before dynamically altering the parameters (as opposed to updating immediately after each frame).

In light of the above description, a number of advantages of the present invention can be seen. The present invention is particularly useful for facilitating communication in a design context, preferably early in the manufacturing process, by integrating parts throughout the design phase to ensure that the entire product fits together seamlessly and meeds the needs of the customer. When complicated components are integrated together in a virtual environment, engineers, product designers, manufacturing personnel and customers can view the results, identify problems and find solutions early in the manufacturing life cycle, reducing costs and leading to higher quality products. The present invention provides a design system which is based on bounded volumes or worlds which assists in organizing data, optimizing rendering and focusing activity in the design environment.

It is contemplated that a major use of the present invention will be in connection with for Computer-Aided Design (CAD). However, the invention is believed to be, in general powerful and extensible and it is also contemplated that the invention may be useable in software or other systems (e.g., in application products) for animation systems, game development, simulation systems, and internet/intranet viewers. It is anticipated that some or all aspects of the invention may be incorporated in a general purpose software development toolkit that would enable application product developers to incorporate the technology into their products as they see fit. The present invention can also be used in digital studios for entertainment media creation purposes, operating systems, such as a 3D viewer of the local and available file-systems and applications, medical imaging, weather forecasting, computation fluid dynamics, engineering analysis, computer-aided manufacturing, architectural engineering and design, electronic design, operations analysis, and the like.

Preferably, the system can handle large number of parts, such as one million or more, at high (interactive) frame rates (at least about 5, preferably about 10 hertz or more). According to the invention, parts or groups of parts are automatically simplified for rendering, e.g., for a fly-through procedure, the user is not required to define simplified representations on a part-by-part basis. Preprocessing organizes the data such that at load time, the volume occupied by the parts is known and may be merged with the volumes occupied by other parts already loaded in the system. Since the data is already spatially organized, processing time required to update simplified geometric representations is reduced. The simplified geometric representation of the present invention not only helps to achieve the desired performance, but is simplified in a visually apparent obvious fashion which helps to avoid potential confusion in a virtual manufacturing environment. For example, the user may need to know if two parts intersect. If the parts do not intersect but the simplified representations do, the user may be confused if the distinction between actual and simplified representations is not apparent.

A number of variations and modifications of the present invention can be used. Although the present invention has been described in terms of a computer-aided design application, the techniques disclosed herein can also be used for other image display purposes, such as computer games, high-definition television, virtual reality displays, computer animation and the like. In one embodiment, the cell faces are provided with textures according to various texture maps. Preferably the required texture maps are created during a pre-processing step. In some embodiments this approach precludes dynamic loading and unloading of parts during a viewer session (which is otherwise possible).

The system can be provided with the capability for capturing the cells and the outline of the view frustum associated with a particular frame. This makes it possible to navigate through the captured scene and analyze the output of various procedures. Preferably, the size of the frustum is increased in this mode to allow viewing from positions that provide a global perspective (i.e., back up far enough to see the entire outline of the view frustum without interference from a clipping plane). In one embodiment, it is possible to freeze the graphics primitives associated with the frame and rotate the image to view the cell facade. The cells that were not drawn become apparent as the scene is rotated. This optimization was not visible before rotation (i.e., the goal of the cell rendering is to present this illusion).

It is possible to provide for capturing the outline of the view frustum and the cells for a particular frame. By alternating the colors used to draw the cell outlines, the cells associated with each slice can be discerned.

In some embodiments it is possible to provide for additional efficiency by avoiding rendering of parts that are subject to geometric occlusion. Geometric occlusion involves determining parts of a scene that are occluded geometrically and do not need to be drawn. In one approach, as a scene is proceeded from front to back, for each slice, the world coordinates of coordinates of significant parts are transformed into image space, i.e., parallel to the far clipping plane. Shadows or projections on the image space plane are accumulated as the image based plane moves back through the scene during processing and the shadows were used to preclude drawing parts that are "in the dark." Such an approach may be used in conjunction with pre-processing to avoid making assumptions that result in improper display (e.g., assuring a part is solid when, in fact, the surface has holes). Pre-processing in this context may also be useful for optimization, e.g., to establish thresholds for part shadow casting that take into account the proximity of the part to the virtual camera and relative orientation of the virtual camera and the part.

In one embodiment the center of the screen is used as a reference point for calculating virtual camera adjustments. Preferably there is a "dead" spot near the center of the screen such that the angle of adjustment is not affected when the cursor is in that area. This helps the user avoid overly-sensitive input adjustments.

In one embodiment, in addition to a fly mode, the user is permitted to initiate an "inspect" mode which provides a direct manipulation interface based on quaternion rotation vectors. An example of a procedure of this general type is described in Bell, Gavin "Software for a Virtual Trackball Implementation" *Computer Graphics*, Siggraph, August 1988, pp. 121–129, incorporated herein by reference. Preferably the user is permitted to select individual parts among those which are displayed and the system may provide detailed information on the parts such as by printing statistical information (name and color index) and the like.

In one embodiment, flight paths (a series of virtual camera positions and orientations) may be recorded and played back. When recorded, the type of scene (motion or static) and the virtual camera location is written to a file for each frame. During such playback mode, the user preferably is permitted to manually pause and resume animation. In one embodiment, playback may be paused automatically at user-specified frame count intervals. This made may be useful for manually capturing images, e.g., for animation.

If desired, certain procedures can be used to assist in the transition from the motion mode to a static scene mode, particularly since, once motion stops, it may take a considerable amount of time for the static (full detail) scene to be rendered. During this transition time, in some embodiments, the user is allowed to interrupt the static scene generation and resume moving. Preferably the user is presented with information indicating the progress being made on drawing the static scene. In one embodiment, the static scene is produced by producing successively-refined intermediate visual representations of the static scene, and, at intervals, checking to see if user has requested an interrupt. Preferably, the successive refinement provides the user with good resolution on closer parts first, without waiting for the remainder of the static scene to be drawn. In one embodiment this is achieved by moving the full-detail boundary farther back into the scene with each intermediate visual representation, until the entire static scene is rendered in full detail.

Figure 13:
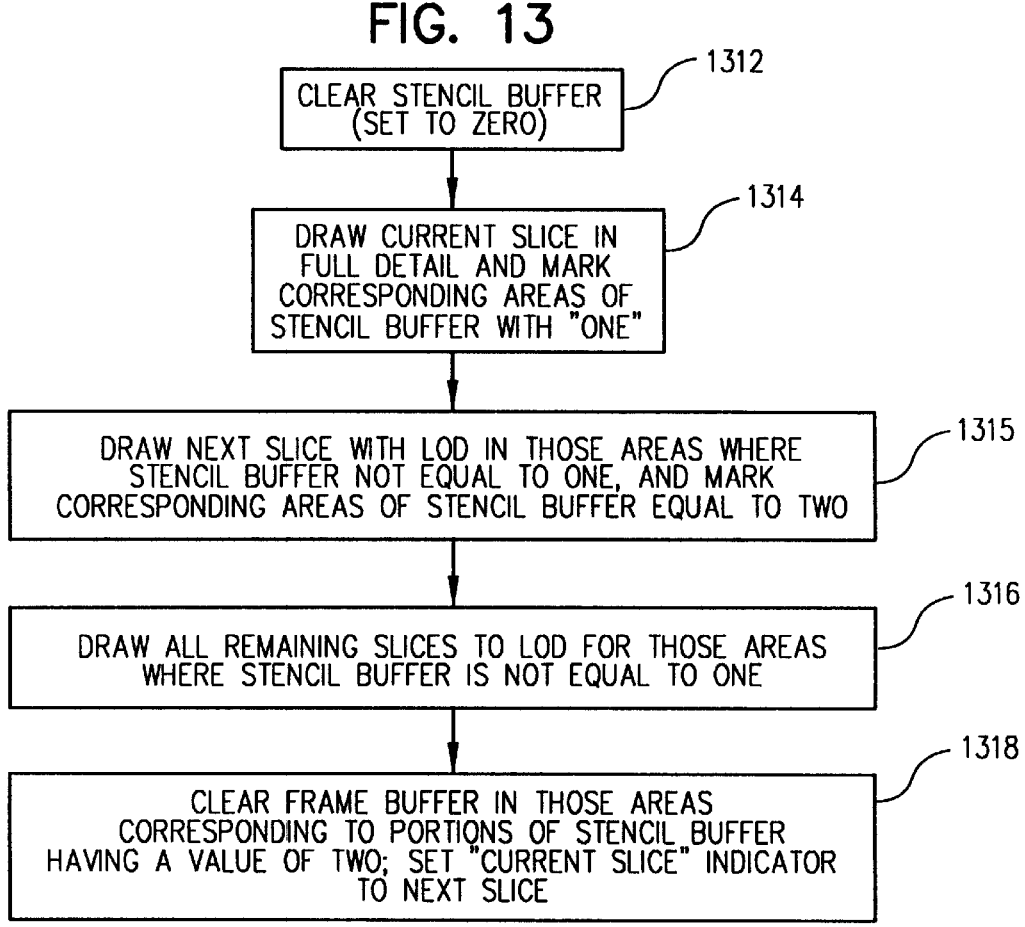
FIG. 13 is a flowchart depicting a process according to an embodiment of the present invention.

A stencil buffer may be used to keep track of what is drawn in full detail and what is drawn as an LOD representation. FIG. 13 depicts a procedure which can be used for this purpose. First the stencil buffer is set to 0 312. The current slice is drawn in full detail and the portions of the stencil buffer corresponding to portions of the scene that are drawn in full detail is marked with a 1. 1314. The next slice is drawn in a simplified (with simplified rendering for this slice) manner, only for those areas where the stencil buffer is not equal to 1 and those areas are then marked with a value equal to two 1315. All the remaining slices are rendered for those areas where the stencil buffer is not equal to 1 but no marking of the stencil buffer is done for those areas 1316. Next, all areas of the frame buffer pixels associated with stencil value buffer equal to 2 are cleared 1318 (this clears the LOD representation that will be replaced with full detail on the next pass) and those areas are set to 0. The procedure returns 1314 to process the scene beginning with the next slice to be done in full detail.

Although as described above, view frustum culling can be performed using cell/plane intersection tests, it is also possible to use an approach that employs a table to look up discrete 3D representations of lines, namely the lines that form boundary edges of the view frustum. In this approach, the procedure walks the edges of the view frustum and looks up the cells along the edge in the table. The procedures interpolates between these cells to find the boundary cells for view frustum slices.

Although the invention has been described in terms of worlds having uniform cells, it is possible to provide the worlds that are not necessarily uniform. In one embodiment, a cell structure can be defined that allows an arbitrary number of uniform cells to be configured at the top. In this case, all of the traversal operations would be required to consult with the layer of cells before continuing down each of the separate hierarchies.

By providing additional data reference structure and cell color distribution, it may be possible to support dynamic geometry changes. In one embodiment, it may be possible to dynamically or quickly toggle the visibility of a particular part or groups of parts, e.g., by optimizing the manner in which a part's cell information is propagated.

Although color precedence was described as being established with respect to a particular world (and thus held static over the course of the session), the system could be configured to allow the color precedence table to updated dynamically. This would support altering the coloring of cells based on the types of parts they contain. For example, if hydraulic parts were blue, electric parts were green, and these parts were common to many cells, the color precedence table could be changed to emphasize either type of part. This might assist in navigational efforts if the user needed to focus on one of the part types.

Although the region-time-distribution was described as being based on a pre-calculation scheme, in another embodiment the time distribution tables may be dynamically updated.

In situations where large geometries are involved, the task may be split in order to optimize rendering. In some embodiments it may be useful to render a particular cell at a coarser LOD if cells in front contain parts that are drawn in a high LOD or in full detail (such that cells behind are at least partially obscured and therefore less important).

Although the present invention can be used to avoid the need for "hand building" LOD representations on a part-by-part basis, in some embodiments it may be useful to provide at least some such hand-built LOD representations, e.g., depending on the complexity of the scene. In some situations, thresholds for using different techniques can be established such as rendering all parts in full detail for low complexity scenes, building LOD representations on a part-by-part basis for medium complexity scenes, grouping parts based on spatial coherence and building LOD representations on a group-by-group basis for high complexity scenes and using the above-described volume-based LOD approach for very high complexity scenes.

In some embodiments it is desired to support hierarchical (i.e. nested) "worlds" and provide the user with the ability to navigate through these hierarchies. Each world in the hierarchy can be defined to encompass a particular part or group of parts that are of interest to the user. Tailoring the size of each world optimizes the geometric simplifications used in that world (i.e. the cells at a particular level in the octree are scaled appropriately). The user can navigate between the worlds by selecting world from a list or by moving the virtual camera with the understanding that this is used as input to another algorithm that selects the most appropriate world based on the current position of the virtual camera and other user-supplied parameters.

Although the above description was generally described based on cubic geometric simplification, volume based simplification can also be provided based on other shapes such as convex polyhedral geometries. This approach may be further useful in avoiding problems with axis-aligned normals.

Although the invention has been defined by way of a preferred embodiment and certain variations and modifications, other variations and modifications can also be used in the invention being defined by the following claims:

What is claimed is:

1. A method for use in a fly-through, three-dimensional, computer-aided design system capable of displaying at least one object of interest, comprising:
    providing data defining said object of interest, including data which can be used for indicating at least some surfaces of said object of interest by a plurality of defined polygons;
    defining a simulated volume of space containing said object of interest, to define a finite volumetric boundary forming the basis for subsequent spatial analysis;
    defining a first plurality of cells within said simulated volume, said first plurality of cells having a first nominal size;
    defining a second plurality of cells within said simulated volume, said second plurality of cells having a second nominal size, less than said first nominal size, wherein at least one of said second plurality of cells is contained at least partially within at least one of said first plurality of cells;
    defining a plurality of groups of said polygons corresponding to parts of said object of interest;
    defining at least a first visual characteristic corresponding to at least some of said groups of polygons;
    forming a list, corresponding to each said second plurality of cells, of those groups of polygons having at least a portion of their surfaces in each of said second plurality of cells;
    displaying a rendering of at least part of said simulated volume wherein at least a portion of said object of interest is represented by a rendering of at least one surface of at least a first cell, said surface of said first cell being rendered so as to have a visual characteristic corresponding to a group of polygons in said list corresponding to said first cell;
    wherein said first and second pluralities of cells define an octree hierarchy of said simulated volume; and
    propagating said list form one hierarchy level of said octree hierarchy to another.

2. A method as claimed in claim 1 wherein at least one of such first plurality of cells is fully occupied by an integral number of said second plurality of cells, said integral number being greater than one.

3. A method as claimed in claim 1 wherein said propagation is done when a new object is put in said data structure.

4. A method as claimed in claim 1 wherein said propagation is performed when said visual characteristic is changed.

5. A method as claimed in claim 1 wherein a data structure is associated with each cell of at least a first level of said hierarchy and wherein said propagation includes performing a bit shift on said data structure.

6. A method as claimed in claim 1 wherein said second plurality of cells is the finest granularity available in said octree hierarchy.

7. A method as claimed in claim 1 wherein said polygons comprise triangles.

8. A method as claimed in claim 1 wherein said visual characteristic is a color.

9. A method as claimed in claim 1 wherein said visual characteristic is a texture.

10. A method as claimed in claim 1 wherein said cells are rectangular parallelepipeds.

11. A method as claimed in claim 1 wherein said first cell is one of said second plurality of cells.

12. A method as claimed in claim 1 wherein said first cell is one of said first plurality of cells and said list corresponds to said first cell if said list corresponds to a cell of said second plurality of cells which is contained at least partially within said first cell.

13. A method as claimed in claim 1 further comprising storing data indicative of at least one of said groups of polygons corresponding to each cell in said second plurality of cells.

14. A method as claimed in claim 13 wherein said data indicates the intersection of a group's surface with cells.

15. A method as claimed in claim 14 wherein said data is indicative of at least two groups of polygons.

16. A method as claimed in claim 15 wherein said visual characteristic is a color and wherein said list indicates a color for each cell corresponding to the highest precedence color in a pre-determined color precedence table among those colors associated with those groups having at least a portion of their surfaces in each of said second plurality of cells.

17. Apparatus for use in a fly-through three-dimensional computer aided design system capable of displaying at least one object of interest comprising:
    means for storing data defining said object of interest including data which can be used for indicating at least some surfaces of said object of interest by a plurality of defined polygons;
    means for storing a simulated volume of space containing said object of interest, to define the finite volumetric boundary forming the basis for subsequent spatial analysis;
    means for storing information defining a first plurality of cells within said simulated volume, said first plurality of cells having a first nominal size;
    means for storing information defining a second plurality of cells within said simulated polygon, said second plurality of cells having a second nominal size less than said first nominal size wherein at least one of said second plurality of cells is contained at least partly within one of said first plurality of cells;
    means for storing information defining a plurality of groups of said polygons corresponding to parts of said objects of interest;
    means for storing information defining at least a first visual characteristic corresponding to at least of said groups of polygons;
    means for identifying and storing a first list, corresponding to each said second plurality of cells, of those groups of polygons having at least a portion of their surfaces in each said second plurality of cells; and
    means for displaying a rendering of at least part of said simulated volume wherein at least a portion of said object of interest is represented by a rendering of at least one surface of at least first cell, said surface of said first cell being rendered so as to have a visual characteristic corresponding to a group of polygons in said list corresponding to said least first cell;

wherein said first and second pluralities of cells define an octree hierarchy of said simulated volume; and means for propagating said list from one hierarchy level of said octree hierarchy to another.

18. A computer-implemented method for use in a fly-through three-dimensional computer aided design system capable of displaying a plurality of pre-defined parts, comprising:

providing data defining said pre-defined parts, including data indicating the surfaces of said parts by a plurality of defined triangles;

defining a simulated volume of space containing said plurality of parts, to define the finite volumetric boundary forming the basis for subsequent spatial analysis;

defining a first plurality of cells within said simulated volume, said first plurality of cells having a first nominal size;

defining a second plurality of cells within said simulated volume, said second plurality of cells having a second nominal size, less than said first nominal size, in an octree relationship with said first plurality of cells, wherein said second plurality of cells represents the finest granularity level within said octree hierarchy;

defining a color corresponding to each of said plurality of parts; and determining, for each of said cells in said second plurality of cells, whether any of said plurality of parts includes a surface which intersects said cell, and, if so, marking said cell on by assigning a color to said cell corresponding to a color which corresponds to at least one part having a surface which intersects said cell;

determining, for every higher level cell in at least a plurality of levels of said octree hierarchy, whether any daughter cell at a lower level in said hierarchy is marked on, and, if so, assigning a color to said cell corresponding to the color of at least one daughter cell;

wherein when at least one of said higher-level cells has corresponding daughter cells associated with a plurality of different colors, said higher level cell is assigned a color from among said plurality of daughter cell colors according to a pre-defined color precedence.

19. A computer-implemented method for displaying a plurality of simulated objects, each object defined by one or more object surfaces, comprising:

(a) storing indications of the shape and location of said simulated objects;

(b) comparing said indications with the positions of a plurality of predefined volumes, and determining which of said predefined volumes are intersected by a surface of said simulated objects to define a plurality of intersected volumes, wherein each of said predefined volumes is defined by one or more volume surfaces;

(c) controlling a computer display device to display an image of at least some of said volume surfaces of at least a first plurality of said intersected volumes, providing a first level of detail; and sorting results from step (b) in memory prior to step (c).

20. A method, as claimed in claim 19 wherein said first plurality of said intersected volumes comprise cells of one of a plurality of coordinate systems making up an octree hierarchy.

21. A method, as claimed in claim 20 further comprising repeating step (b) and controlling a computer display device to display an image of at least some of said volume surfaces of at least a second plurality of said intersected volumes.

22. A method, as claimed in claim 21 wherein said second plurality of said intersected volumes comprise cells of another of said plurality of coordinate systems, providing a second level of detail, different from said first level of detail.

23. A method, as claimed in claim 22 wherein said first and second levels of detail are provided automatically by said computer, without the need to manually specify a simplified version of any of said objects.

24. A method, as claimed in claim 22 further comprising:

automatically selecting, by said computer, a level of detail to be used for rendering at least a portion of an image.

25. A method, as claimed in claim 24 wherein said step of selecting comprises selecting a level of detail based on a predetermined minimum frame rate.

26. A method, as claimed in claim 24 wherein said step of selecting comprises predicting an amount of time required to render at least a first portion of an image at a first level of detail; and rendering at a coarser level of detail if said amount of time is greater than a first time allotted for rendering said first portion.

27. A method, as claimed in claim 26 wherein said predicting is based on the amount of time used to render at least a portion of a previous image.

28. A method, as claimed in claim 26 wherein said portion is a one of a plurality of slices of the total volume capable of being rendered, said slices being defined by substantially parallel planes.

29. A method, as claimed in claim 28 further comprising storing, prior to step (c), a plurality of allotted rendering times corresponding to said slices and wherein said first time is one of said plurality of allotted rendering times.

30. A method, as claimed in claim 28, wherein at least some of said allotted rendering times are associated with a plurality of scene-complexity-value indicators, and further comprising:

obtaining a first scene-complexity-value for said one slice; and using, as said first time, one of said plurality of allotted rending times which is associated with one of said plurality of scene-complexity-value indicators corresponding to said first scene-complexity-value.

31. A method, as claimed in claim 30 wherein said image is displayed after the display of a preceding image, the display of said preceding image including display of a plurality of polygons in each of a plurality of image slices; and wherein said first scene-complexity-value of said first slice is determined based how many polygons were displayed in a corresponding slice of said preceding image.

32. A computer-implemented method for displaying simulated objects, comprising:

a step for displaying an image of a first plurality of said simulated objects in full detail, requiring at least a first amount of time, from a time of initiating said step for displaying;

receiving at least a first input from a user prior to expiration of said first amount of time;

interrupting said step for displaying, in response to said user input, and initiating the displaying of at least some of said simulated objects in a simplified manner, not in full detail.

33. A computer-implemented method, as claimed in claim 32 wherein said first input is a command to commence a fly-through mode.

34. A computer-implemented method, as claimed in claim 32, wherein said step for displaying comprises displaying at least a portion of said image prior to expiration of said first amount of time.

35. A computer-implemented method, as claimed in claim 32, further comprising displaying an indication of progress toward completion of said step of displaying.

36. Apparatus for use in a fly-through three-dimensional computer-implemented display system capable of displaying at least one object of interest comprising:

means for storing data defining said object of interest;

means for storing a simulated volume of space containing said object of interest, to define the finite volumetric boundary forming the basis for subsequent spatial analysis;

means for storing information defining a first plurality of cells within said simulated volume, said firs plurality of cells having a first nominal size;

means for storing information defining a second plurality of cells within said simulated polygon, said second plurality of cells having a second nominal size less than said first nominal size wherein at least one of said second plurality of cells is contained at least partly within one of said first plurality of cells;

means for storing information corresponding to parts of said objects of interest;

means for storing information defining at least a first visual characteristic corresponding to at least parts of said objects of interest;

means for identifying and storing a first list, corresponding to each said second plurality of cells, of those parts of said objects of interest having at least a portion of their surfaces in each said second plurality of cells; and means for displaying a rendering of at least part of said simulated volume wherein at least a portion of said object of interest is represented by a rendering of at least one surface of at least a first cell, said surface of said first cell being rendered to as to have a visual characteristic corresponding to an entry in said list corresponding to said least first cell; and adaptive cell level means for selecting cell levels in an adaptive fashion.

37. Apparatus as claimed in claim 36 wherein said part of said simulated volume substantially lies within a first view frustum and further comprising means for performing a fast approximation near an apex of said viewing frustum.

38. Apparatus as claimed in claim 36 wherein said means for displaying a rendering comprises defining planes which define a plurality of slices of said simulated volume.

39. Apparatus as claimed in claim 38 further comprising incremental slice processing means for processing said slices in an incremental fashion.

40. Apparatus as claimed in claim 36 further comprising hierarchical cell processing means for processing said cells in a hierarchical fashion.

41. Apparatus as claimed in claim 36 further comprising spatial data distribution means.

42. Apparatus as claimed in claim 37 wherein a plurality of regions are defined, each comprising one or more of said slices, and further comprising LOD transition means.

43. Apparatus as claimed in claim 36 further comprising stencil buffer means for use in static scene successive refinement.

44. Apparatus as claimed in claim 36 further comprising plane mask means for reducing or minimizing the number of intersection tests performed when traversing descendant cells.

45. Apparatus as claimed in claim 36 further comprising means for sorting cell distances.

46. Apparatus as claimed in claim 36 further comprising means for storing an indication of whether all visible surfaces of an integral number of said second plurality of cells is to be rendered and, in response, rendering said one of said first plurality of cells.

47. Apparatus as claimed in claim 36 further comprising means for storing as a density value an indication of how many of an integral number of said second plurality of cells includes surfaces to be rendered and rendering said one of said first plurality of cells when said density value exceeds a threshold value.

48. Apparatus as claimed in claim 36 further comprising means for reducing cell face rendering calculations in the case of cell neighbor occlusion.

49. Apparatus as claimed in claim 36 further comprising means for providing a near clipping plane extent.

50. Apparatus as claimed in claim 36 further comprising cell face buffering means.

51. Apparatus as claimed in claim 36 further comprising cell face mask means.

52. Apparatus as claimed in claim 37 further comprising means to predict time to render a slice.

53. Apparatus as claimed in claim 52 wherein said means to predict is used to update a LOD before drawing.

54. Apparatus as claimed in claim 36 wherein each cell has no more than N faces and further comprising means to determine, for each cell to be rendered, which of the N faces to rendering.

55. Apparatus as claimed in claim 36 further comprising means for performing a cell-to-part mapping based on whether a surface of a part intersects a cell, regardless of whether non-surface portions of a part intersect.

56. Apparatus as claimed in claim 36 further comprising means for performing front-to-back processing based on spatial distances at a particular level.

57. Apparatus as claimed in claim 36 further comprising reactive frame rate control means for adjusting a reductive scheme.

58. Apparatus as claimed in claim 36 wherein said fly-through aspect is provided with means for controlling viewpoint acceleration.

59. Apparatus as claimed in claim 58 wherein said means for controlling comprises means for providing a ramp-up to target velocity.

60. Apparatus as claimed in claim 59 further comprising means for providing fine-grained control by stopping and then clicking a mouse or other input device.

61. Apparatus as claimed in claim 36 further comprising means for providing variable visual acuity.

62. Apparatus as claimed in claim 61 further comprising providing acuity which is clearer at center of the field of view than at the periphery.

63. Apparatus as claimed in claim 37 wherein said slices are curved.

* * * * *